(12) United States Patent
Huling et al.

US007335246B2

(10) Patent No.: US 7,335,246 B2
(45) Date of Patent: *Feb. 26, 2008

(54) CONTAMINANT ADSORPTION AND OXIDATION VIA THE FENTON REACTION

(75) Inventors: Scott G. Huling, Ada, OK (US);
Robert G. Arnold, Tucson, AZ (US);
Raymond A. Sierka, Tucson, AZ (US)

(73) Assignee: United States of America Enviromental Protection Agency, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/681,376

(22) Filed: Mar. 9, 2004

(65) Prior Publication Data

US 2004/0134857 A1    Jul. 15, 2004

Related U.S. Application Data

(63) Continuation-in-part of application No. 09/649,816, filed on Aug. 28, 2000, now Pat. No. 6,663,781, which is a continuation-in-part of application No. 09/310,932, filed on May 13, 1999, now abandoned.

(60) Provisional application No. 60/085,416, filed on May 14, 1998.

(51) Int. Cl.
*B01D 53/02* (2006.01)

(52) U.S. Cl. .......................................... 95/141; 95/148

(58) Field of Classification Search ............... 210/668, 210/673, 679, 694, 747, 759, 763; 95/141, 95/148; 96/153
See application file for complete search history.

(56) References Cited

U.S. PATENT DOCUMENTS

| | | | |
|---|---|---|---|
| 5,051,189 A * | 9/1991 | Farrah | 210/679 |
| 5,198,001 A * | 3/1993 | Knebel et al. | 95/141 |
| 5,534,154 A | 7/1996 | Gillham | 210/668 |
| 5,667,690 A | 9/1997 | Doddema et al. | 210/631 |
| 5,716,528 A | 2/1998 | Jasim et al. | 210/668 |
| 5,755,977 A | 5/1998 | Gurol et al. | 210/759 |
| 5,967,230 A | 10/1999 | Cooper et al. | 166/245 |
| 6,319,303 B1 * | 11/2001 | Guillard et al. | 95/97 |
| 6,663,781 B1 * | 12/2003 | Huling et al. | 210/668 |

FOREIGN PATENT DOCUMENTS

WO    WO 95/21794 A1 *  8/1995
WO    WO 99/58239        * 11/1999

OTHER PUBLICATIONS

Scott G. Huling et al, "Influence of Peat on Fenton Oxidation", Wat. Res., 2001, pp. 1687-1694, vol. 35, No. 7, Great Britain.
Scott G. Huling et al, "Measurement of Hydroxyl Radical Activity in a Spoil Slurry Using the Spin Trap α- (4-Pyridyl-1-Oxide)-*N*-*TERT*-Butylnitrone", Environmental Science & Technology, 1998, pp. 3436-3441, vol. 32, No. 21, Published on Web Sep. 18, 1998.
Scott G. Huling et al, "Predicting Fenton-Driven Degradation Using Contaminant Analog", Journal of Environmental Engineering, Apr. 2000, vol. 126, No. 4, pp. 348-353.
Scott G. Huling et al, "Contaminant Adsorption and Oxidation via Fenton Reaction", Journal of Environmental Engineering, Jul. 2000, vol. 126, No. 7, pp. 595-600.
U.S. Environmental Protection Agency: National Risk Management and Research Laboratory, "Contaminant Adsorption and Oxidation via Fenton Reaction", The Environmental Technology Commercialization Center, Aug. 2000.

* cited by examiner

*Primary Examiner*—Frank M. Lawrence
(74) *Attorney, Agent, or Firm*—Browdy and Neimark

(57) ABSTRACT

Contaminated fluids are treated by adsorbing contaminant onto a sorbent to concentrate the contaminant and then oxidizing the contaminant via the Fenton and related reactions. Iron is attached to the sorbent or can be added in solution with an oxidant. Both systems, iron attached to the sorbent or iron in solution, can be used to oxidize contaminants on or near the surface of the sorbent. The process can be used to treat contaminated water in above-ground and below-ground treatment systems, as well as contaminated gases.

12 Claims, 7 Drawing Sheets

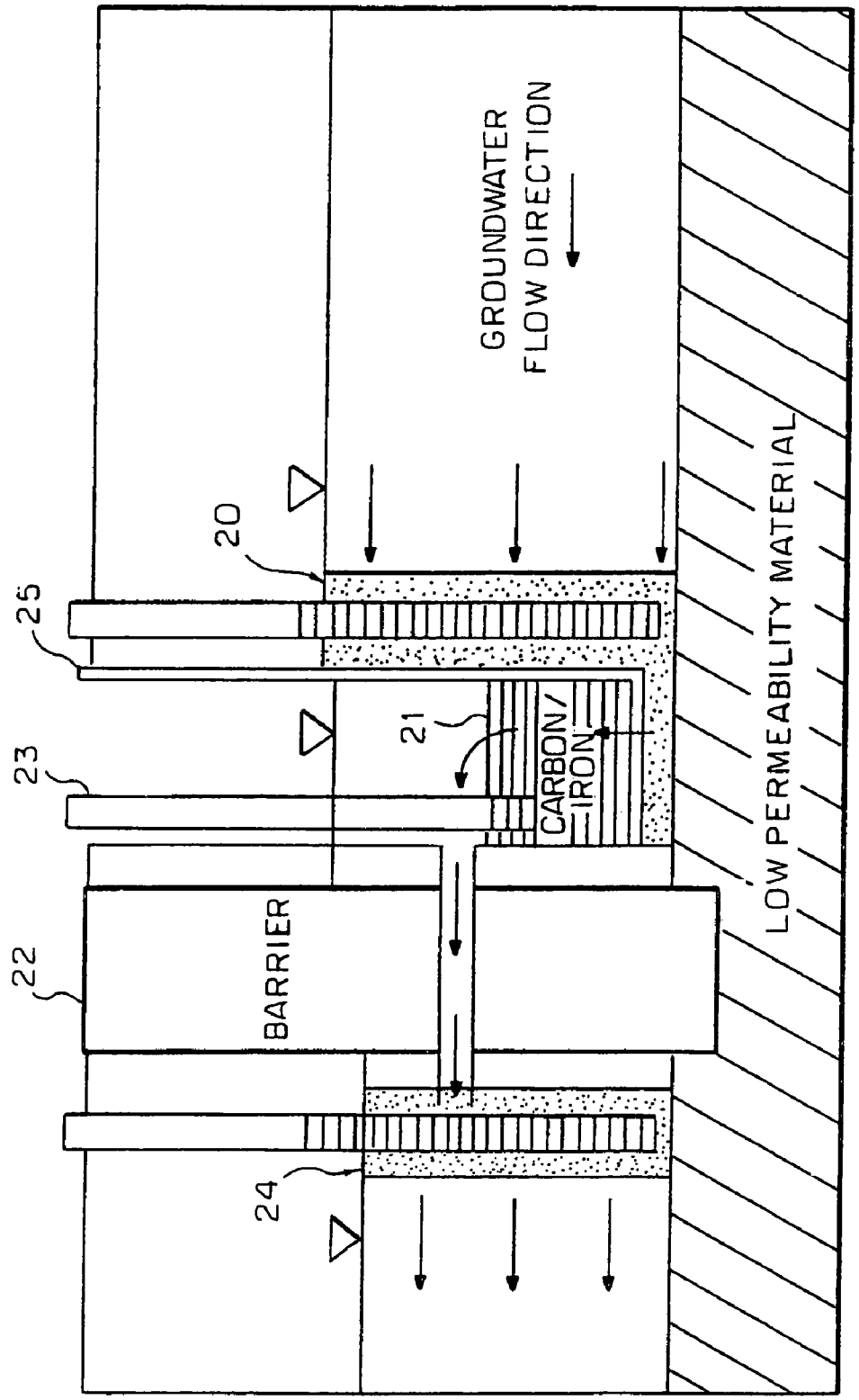

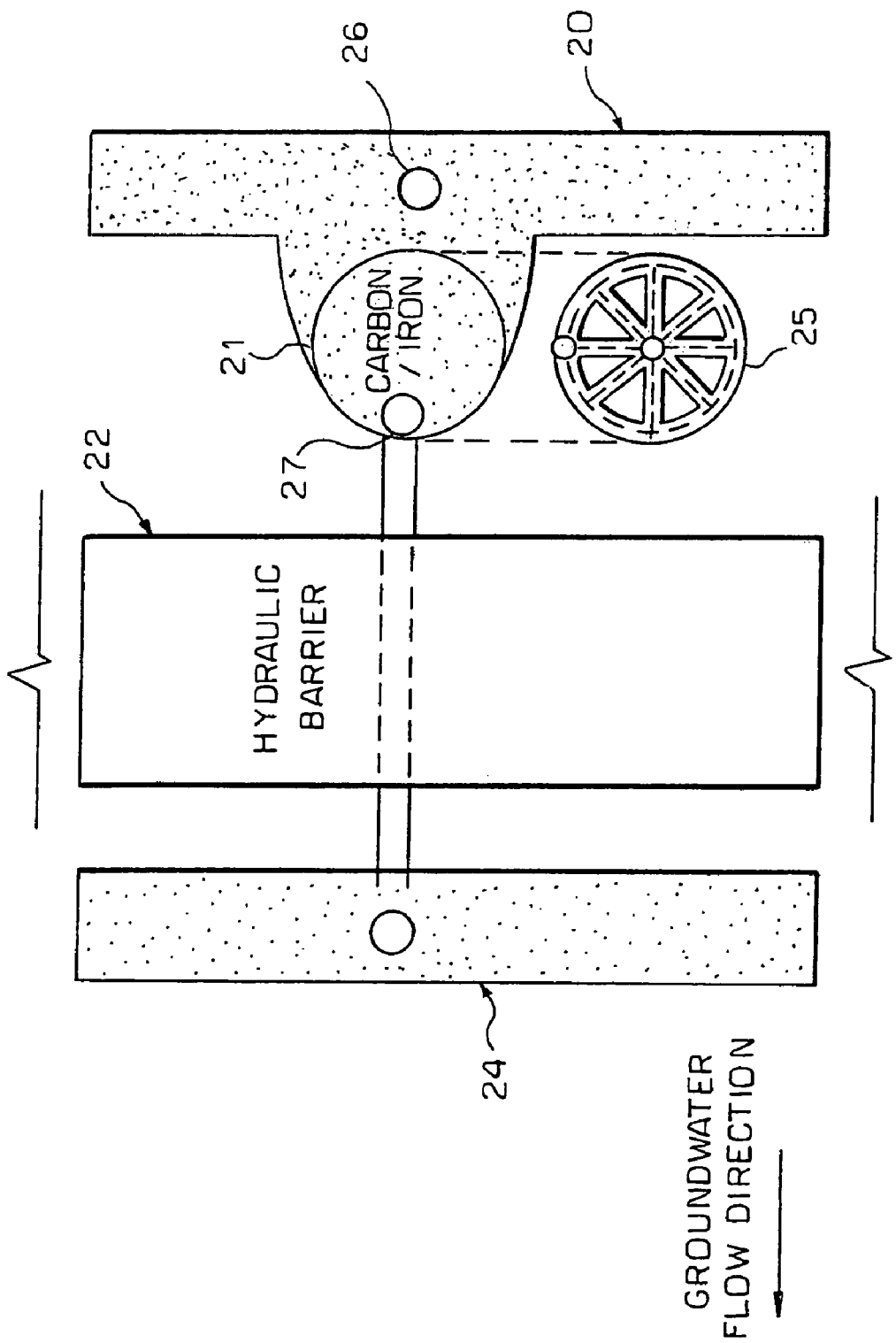

CONTAMINANT ADSORPTION AND OXIDATION VIA THE FENTON REACTION

CROSS-REFERENCE TO RELATED APPLICATIONS

The present application is a continuation-in-part of Ser. No. 09/649,816, filed Aug. 28, 2000 now U.S. Pat No. 6,663,781, which is a continuation-in-part of Ser. No. 09/310,932 filed May 13, 1999 now abandoned, which claims priority from provisional application Ser. No. 60/085, 416, filed May 14, 1998, the entire contents of both of which are hereby incorporated by reference. This application also claims priority from Provisional Application Ser. No. (not yet received), filed May 22, 2000, the entire contents of which are hereby incorporated by reference.

FIELD OF THE INVENTION

The present invention is directed to a process for treating contaminated water using a combination of adsorption and oxidation.

BACKGROUND OF THE INVENTION

There are many limitations in ground water cleanup programs, which limiting factors are considered in the lifetime costs of implementing remedial actions (O'Brien et al, 1997). For this reason, permeable reactive barriers and funnel and gate systems are currently the most cost effective methods for cleaning ground water.

There are currently several chemical oxidation systems in which soil for aquifer material has been remediated using hydrogen peroxide in the Fenton mechanism. These systems include injecting hydrogen peroxide in situ, surface soil application and soil slurry reactors. Each of these systems has potential limitations which ultimately affect the feasibility of the system in treating groundwater.

Blowes et al., in U.S. Pat. Nos. 5,362,394 and 5,514,279, disclose treating contaminated water by excavating a trench in the aquifer in the path of a contaminant plume, and placing a body of active material which causes the contaminant, by chemical reaction, to change its oxidation-reduction state and to precipitate harmlessly in the body of the material. This process merely involves flowing waste through the active material without concentrating the contaminant.

Doddema et al., in U.S. Pat. No. 5,667,690, disclose a process tor treating contaminated water involving a complex of a transition metal and a polyamine in the presence of a peroxide. Doddema et al. propose that in situ treatment of contaminated water involves passing a solution of an iron-polyamine complex through the soil or material in such a way that all soil particles come sufficiently in contact with the iron-polyamine complex and peroxide. This approach essentially involves injecting a mixture of the peroxide and iron-polyamine complex into the subsurface. This involves oxidation of contaminants in the subsurface, as is. There is no adsorption of the contaminants from the aqueous phase onto reactive media followed by oxidation of the contaminants on or near the surface on which the contaminant was concentrated. Additionally, the iron-polyamine complex is not fixed to the surface of carbon particles. According to Doddema, transition metals such as iron, manganese, and cobalt can be used, and the reactions are conducted at a pH of 9.5.

Gurol, in U.S. Pat. No. 5,755,977, discloses oxidation of target contaminants in the aqueous phase. In this patent, iron is used in the mineral form as goethite, and the pH range is 5-9.

Jasim et al., in U.S. Pat. No. 5,716,528, discloses a homogeneous (aqueous phase) reaction of $Fe^{+2}$ and hydrogen peroxide to oxidize pentachlorophenol. Activated carbon is used merely for post-oxidation treatment, i.e., as a polishing step. Adsorption and oxidation occur in sequential treatment reactors.

Gilham, in U.S. Pat. No. 5,534,154, teaches primarily reductive (dehalogenation) reactions which are quite different from oxidation reactions. Reduction involves donating an electron from a reduced moiety, e.g., $Fe^0$, to a compound (contaminant).

Leachate generation is a potential limitation in surface soil application of hydrogen peroxide, resulting in the downward transport of contaminants. In soil slurry reactors, the treatment volume of contaminated soil is generally small, representing a limitation to the overall treatment process.

Competition kinetics can significantly reduce treatment efficiency and minimize effectiveness when scavengers react with hydroxyl radicals more rapidly than the target compound, as shown in Table 1. Scavenging can be minimized by using low ionic strength or low hardness make-up water for the hydrogen peroxide solution.

TABLE 1

Chemical Reactions Involving $H_2O_2$, Iron, 4-POBN, 2CP and Scavengers

| | |
|---|---|
| $H_2O_2 + Fe(II) \rightarrow Fe(III) + OH^- + \bullet OH$ | (1) |
| $H_2O_2 + Fe(III) \rightarrow Fe(II) + \bullet O_2^- + 2H^+$ | (2) |
| $4\text{-POBN} + \bullet OH \rightarrow \bullet 4\text{-POBN}$ | (3) |
| $2CP + \bullet OH \rightarrow$ reaction products | (4) |
| $\Sigma^n_{i=1} k_i$ | |
| $\bullet OH + \Sigma^n_{i=1} S_i \rightarrow$ products of scavenging reactions | (5) |
| $\bullet O_2^- + Fe(III) \rightarrow Fe(II) + O_2$ | (6) |
| $H_2O_2 + 2Mn(II) + 2H_2O \rightarrow 2MnOOH(s) + 4H^+$ | (7) |
| $H_2O_2 + 2MnOOH(s) + 4H^+ \rightarrow 2Mn(II) + O_2 + 4H_2O$ | (8) |
| catalase | |
| $H_2O_2 + O_2 + 4H_2O$ | (9) |

| where | | |
|---|---|---|
| | $\bullet OH$ | hydroxyl radical |
| | $\bullet O_2^-$ | superoxide radical |
| | 4-POBN | spin-trap compound |
| | $\bullet 4$-POBN | radical adduct |
| | 2CP | 2-chlorophenol |
| | $S_i$ | concentration of individual scavengers |
| | $k_i$ | second-order rate constant (L/mol-s) for $\bullet OH$ with $S_i$ |

| Reaction | Reaction Rate Constant and General Comments |
|---|---|
| 1 | $k_i$ = 53•01 l?mol-s (Ingles, 1972), 76 L/mol-s (Walling, 1975) |
| 2 | Rate constant not reported; reaction involves soluble and solid phase iron |
| 3 | $k_3 = 3.8 \times 10^9$ L/mol-s, pH 7 (Buxton et al., 1988) |
| 4 | $k_4 = 1.2 \times 10^{10}$ L/mol-s (Getoff and Solar, 1986) |
| 5 | $\Sigma^n_{i=1} k_i[S_i]$ - pseudo-first-order rate constant ($T^{-1}$) for $\bullet OH$ scavenging by all constituents of the solution except the probe |
| 6 | $k_6 = 2.7 \times 10^8$ L/mol-s |

Limited reaction kinetics is the condition in which low concentrations of the target compound limits the second-order oxidation reaction. Correspondingly, the clean-up goal for the target compound in the ground water can be difficult to achieve. Exacerbating the issue are the numerous scavengers which effectively compete against low concentrations of target compound for hydroxyl radicals.

While adsorption using activated carbon and oxidation using the Fenton mechanism has been widely used separately in ground water remediation and wastewater treatment, problems associated with oxidation in subsurface systems involve poor reactions kinetics, excessive scavenging and excessive non-productive hydrogen peroxide consuming reactions. Problems associated with adsorption in subsurface systems relate to exhausting the sorption capacity of carbon. To replace the carbon, it must be excavated and transported To a specialized facility for disposal. Long-term risks associated with this disposal are environmentally undesirable. If the carbon is reactivated rather than disposed of, additional costs are incurred.

Enzymatic and manganese reactions with hydrogen peroxide can consume hydrogen peroxide in reactions which do not yield hydroxyl radicals (cf. Table 1 and FIG. 2). Selection criteria for granulated activated carbon should, therefore, include low manganese content. The iron content of the granulated activated carbon can be increased to enhance the Fenton mechanism. The effect of the enzymatic reactions are relatively short term because hydrogen peroxide inhibits catalase enzyme activity via the formation of an intermediate-enzyme-substrate compound (Nicholls and Schonbaum, 1963; Aggarwal et al., 1991).

SUMMARY OF THE INVENTION

It is an object of the present invention to overcome the aforementioned deficiencies in the prior art.

It is another object of the present invention to provide a method for treating contaminated fluids.

It is a further object of the present invention to provide a method for treating any waste stream which includes compounds which adsorb and can be oxidized by the hydroxyl radical.

It is still another object of the present invention to provide a method for treating a gas for removing contaminants therefore.

It is yet another object of the present invention to provide a method for treating air for removing contaminants, wherein the contaminants are compounds that can be oxidized by the hydroxyl ion.

For the purposes of the present invention, the term Acontaminated water@ includes any water, waste stream, or ground water which has compounds which adsorb and can be oxidized by the hydroxyl radical.

For purposes of the present invention, "contaminated gas" or "contaminated air" means any gas or air that is contaminated with compounds that adsorb and can be oxidized by the hydroxyl radical. Additionally, the contaminant may be a gas.

According to the present invention, contaminated fluid is treated by first adsorbing contaminants onto a suitable non-treated sorbent and subsequently oxidizing the compounds near the surface of the sorbent. In one embodiment, contaminants are adsorbed onto activated carbon containing iron, or which has been amended with iron in solution, which concentrates contaminants from the contaminated fluid onto the reactive medium. Hydrogen peroxide or other oxidizing agent is then added, which reacts with iron to generate hydroxyl radicals which oxidize the adsorbed contaminants.

In the process of the present invention, contaminants are oxidized using a Fenton-driven mechanism and destroyed in situ, and the sorbent is reactivated/regenerated in situ. That is, the contaminants which can be treated by the process of the present invention are substances which can be oxidized by hydroxyl radicals through the Fenton mechanism. This process makes it possible to treat mixed wastes. For example, benzene, xylene, toluene, and halogenated compounds such as 2-chlorophenol can be treated in the same waste stream, whereas conventional zero-valent iron treatment only involved dehalogenation. The adsorption/oxidation system of the present invention provides for adsorbing and oxidizing contaminants on the sorbent surface. This process is also much more efficient than conducting the Fenton reaction in bulk liquid.

Adsorption immobilizes and concentrates the contaminants onto the iron-treated sorbent. Treatment involves adding an oxidizing agent to the surface or solution of the iron-treated sorbent, which produces hydroxyl radical as a reaction intermediate. The hydroxyl radical oxidizes the contaminants sorbed to or very near the surface of the iron-treated sorbent. This treatment process overcomes some of the limitations of other chemical oxidation processes involving oxidation of contaminants.

BRIEF DESCRIPTION OF THE DRAWINGS

FIG. 1 is a schematic of the adsorption/oxidation process of the present invention.

FIG. 2 is a cross-sectional diagram of a hydraulic barrier and adsorption/oxidation treatment unit. This illustrates another embodiment in which the method can be used in an in-situ passive scenario FIG. 3 is a plan-view diagram of a hydraulic barrier and adsorption/oxidation treatment unit.

DETAILED DESCRIPTION OF THE INVENTION

Figure 1A:
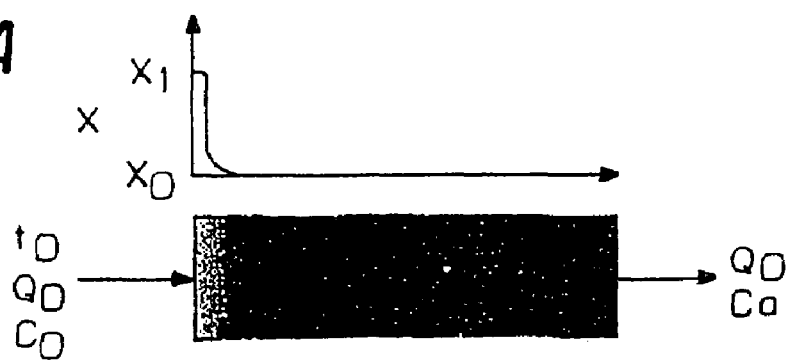
FIG. 1A shows the initial time and concentration and the flow ($Q_0$) of water containing contaminants at an initial concentration ($C_0$) into the sorbent/iron medium, which results in contaminant adsorption to the granulated activated carbon yielding an acceptable effluent concentration ($C_a$).
Figure 1B:
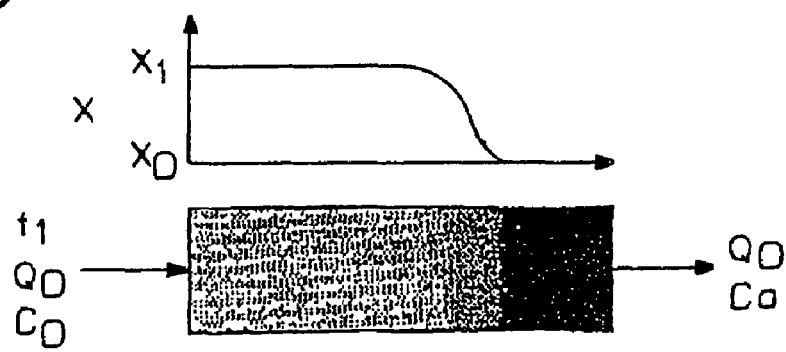
FIG. 1B shows that contaminants concentrate on the carbon/iron medium and reach an equilibrium concentration ($X_i$).
Figure 1C:
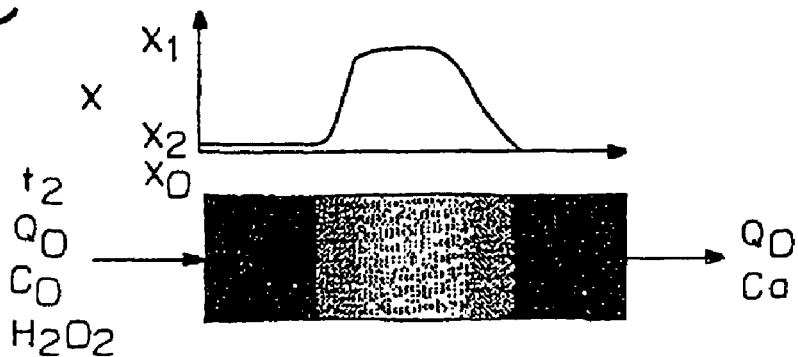
FIG. 1C shows that hydrogen peroxide perfused into the carbon/iron medium initiates the Fenton mechanism. This results in the formation of hydroxyl radicals, which oxidizes sorbed contaminants, thus decreasing the concentration of contaminants and regenerating the granulated activated carbon ($X_2$).
Figure 1D:
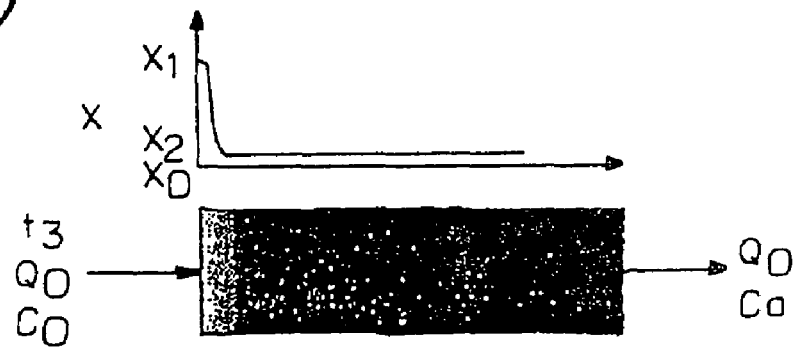
FIG. 1D shows cessation of hydrogen peroxide application and contaminated water continuing to flow through the reactive medium for another cycle.
Figure 4:
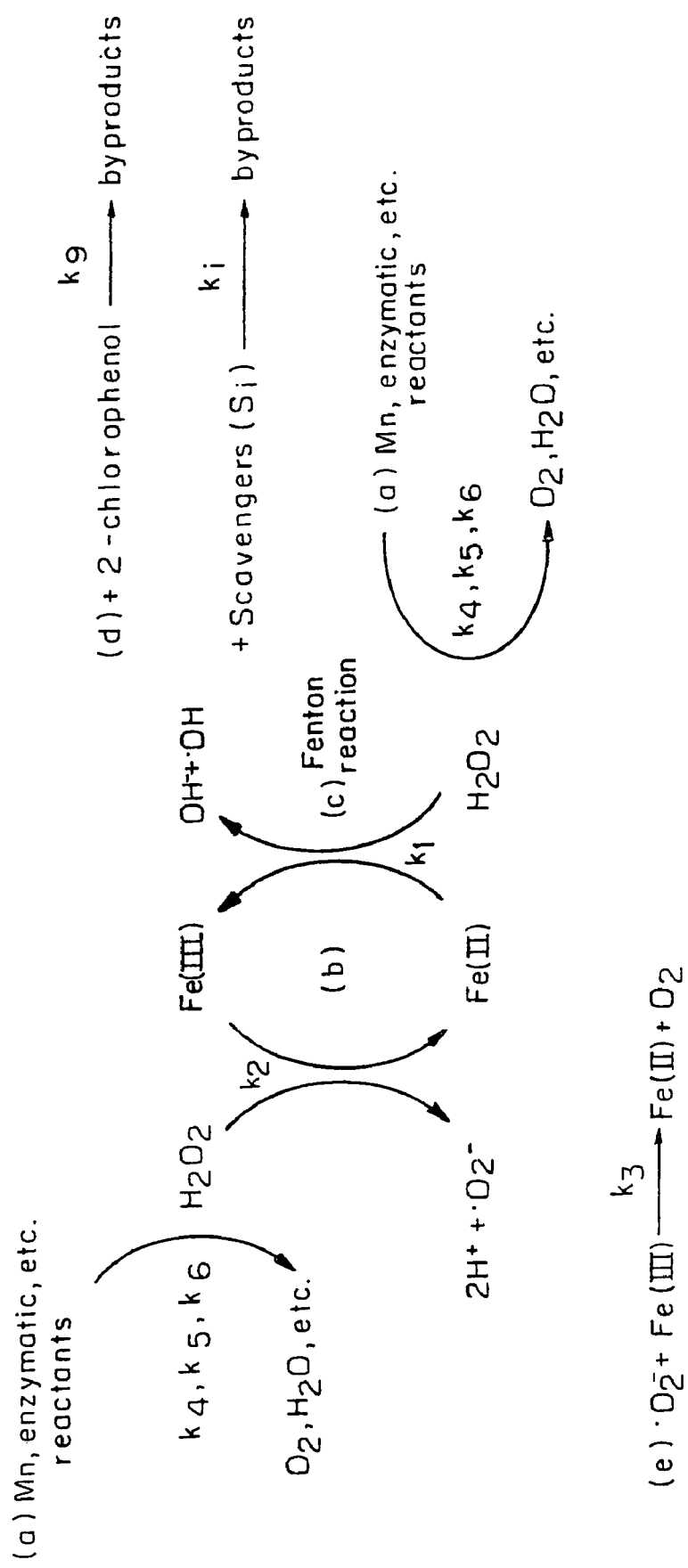
FIG. 4 is a schematic of hydrogen peroxide reactions in soil slurry containing 2-chlorophenol. (a) is non-hydroxyl radical producing reactions; (b) is cycling between Fe(II) and Fe(III) oxidation states; (c) is production of hydroxyl radical via the Fenton reaction; (d) is competition between 2-chlorophenol and scavengers (Si) for hydroxyl radical; and (e) is the reduction of Fe(III) via the superoxide radical.
Figure 5:
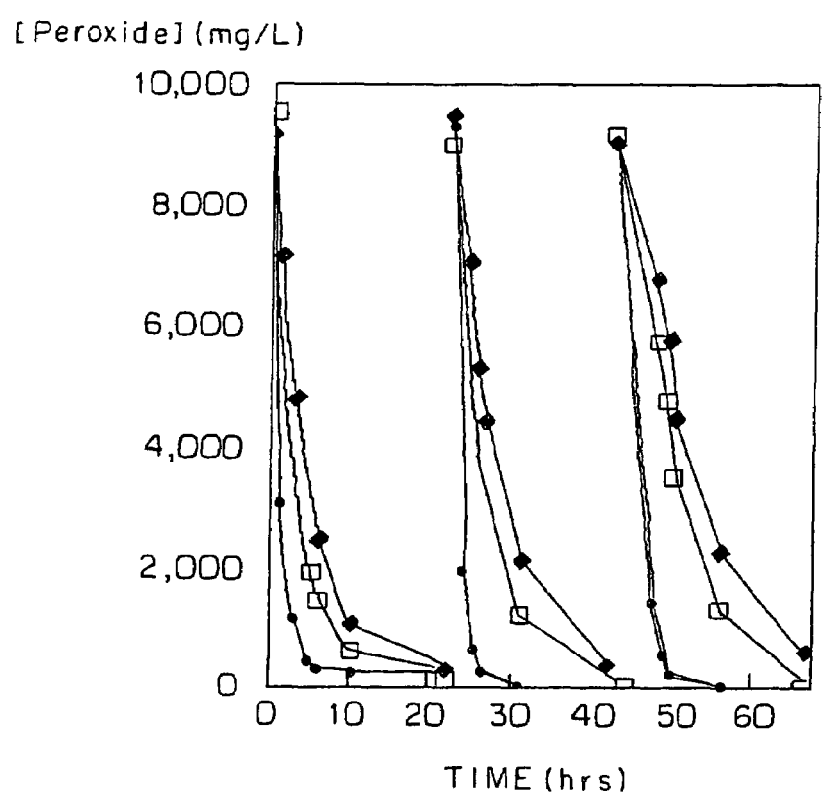
FIG. 5 shows time-dependent concentrations of hydrogen peroxide in batch reactors containing different types of granulated activated carbon with three successive applications of 100 mL 0.9% hydrogen peroxide into 1 g granulated activated carbon with [2CP]=35.4 g/Kg.
Figure 6:
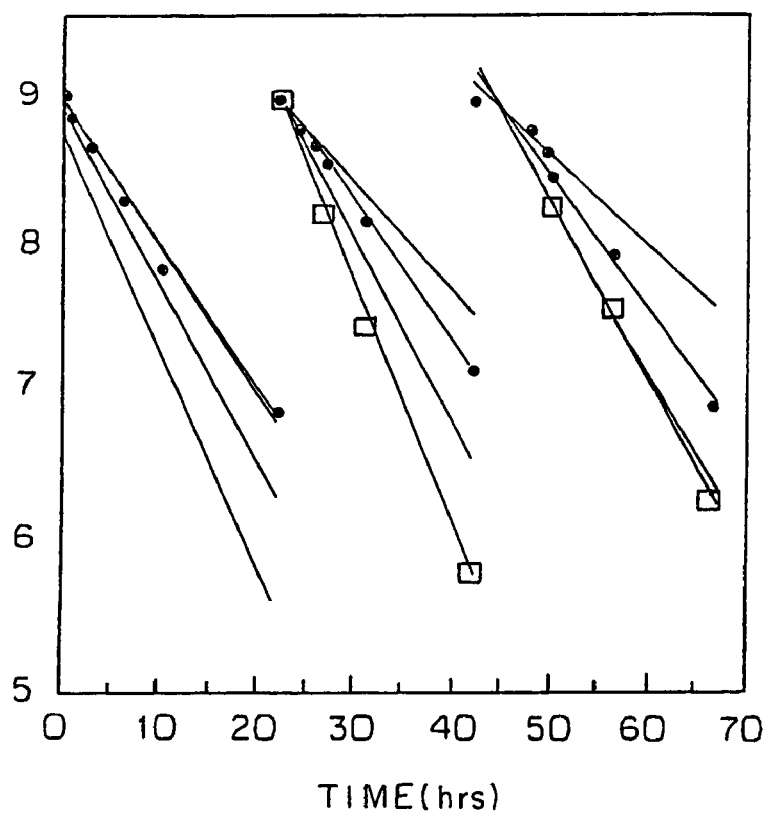
FIG. 6 shows time-dependent concentrations of hydrogen peroxide in batch reactors containing granulated activated carbon with different concentrations of iron (none, low, medium, high, containing 24.0, 5500.0, 9790.0, 12050.0 mg/Kg total iron, respectively); three successive applications of 100 mL 0.9% hydrogen peroxide into 1 g granulated activated carbon with 2CP=35.4 g/Kg.
Figure 7:
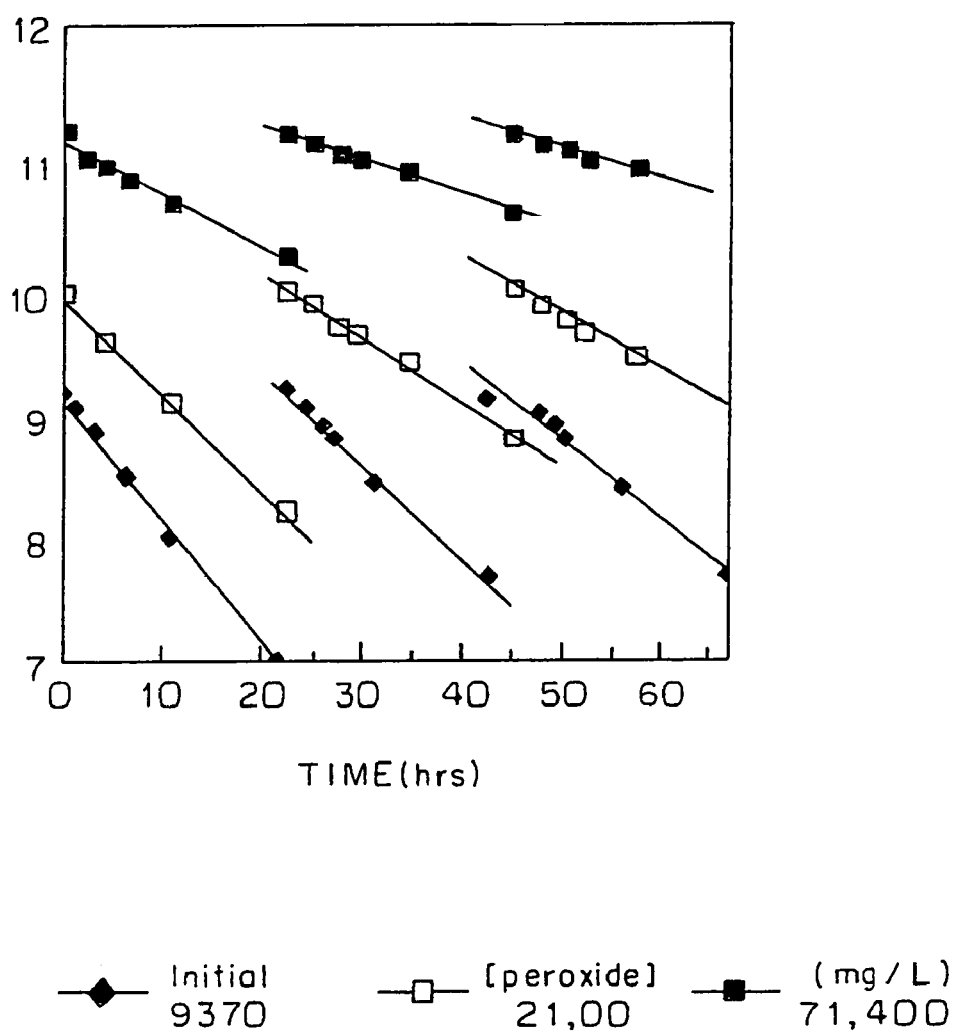
FIG. 7 shows time-dependent concentrations of hydrogen peroxide in batch reactors containing granulated activated carbon, Fe=5500.0 mg/Kg, with different initial concentrations of hydrogen peroxide (9370, 21400, 71400 mg/L, respectively. Three successive applications of 100 mL 0.9% hydrogen peroxide into 1 g granulated activated carbon with 2CP=35.4 g/kg.

Contaminated fluid is treated by a combination of adsorption of organic compounds in the fluid onto a sorbent to concentrate the contaminants and subsequent oxidation on the sorbent. This process is illustrated schematically in FIG. 1, using water as the illustrative fluid. However, substantially the same process can be used for treating a gas. Contaminated ground water flows ($Q_0$) through a granulated activated carbon bed where contaminates adsorb onto the carbon. This results in acceptable concentrations of contaminants ($C_A$) in the effluent. Subsequently, the purified water continues through the treatment unit and back into the aquifer (FIG. 1A). Adsorption immobilizes and concentrates the contaminants onto the sorbent, which also contains iron which is capable of facilitating Fenton-driven oxidation reactions. Prior to breakthrough of contaminants from the reactive granulated activated carbon (FIG. 1B), an oxidant, such as hydrogen peroxide, is injected, which reacts with iron, generating a strong oxidant, the hydroxyl radical. The hydroxyl radical oxidizes sorbed contaminants (FIG. 1D). Ideally, the sorbent is treated in situ, and the sorption capacity of the sorbent is regenerated (FIG. 1D). The application of oxidant is performed at appropriate intervals to maintain an acceptable concentration in the contaminated water passing through the reactive unit.

The process of the present invention can be used to treat contaminated water in situ or in a specially constructed container. The process can be used above ground or below ground. For treating groundwater, the water treatment system can be constructed entirely below grade and can be entirely gravity driven, all of which reduces operation and maintenance costs. The system is easily monitored.

A broad range of fluid contaminants, including halogenated solvents, polycyclic aromatic hydrocarbons, petroleum constituents, etc., have a sufficiently high reaction rate constant with hydroxy radical and thus are valuable target compounds to be oxidized. Because there are so many contaminants that have a sufficiently high reaction rate constant with hydroxyl radical that they can be oxidized by the present process, the treatment method of the present invention has wide application.

The classic Fenton reaction specifically involves the reaction between $H_2O_2$ and ferrous iron [(Fe(III)] to yield a hydroxyl radical (.OH) and ferric iron [(FeIII)], the first reaction shown in Table 2. Ferric iron, a by-product from thhis reaction, can react with $H_2O_2$ or the superoxide radical (.O2-), yielding ferrous iron (reaction 2 in Table 2), which can in return react with $H_2O_2$. Overall, however, in mot remediation systems, Fe(II) is the limiting moiety, since the reduction of Fe(III) is slow and addition of Fe(II) is problematic.

Treating contaminated water according to the present invention involves four main processes: advection, adsorption, reduction, and oxidation. That is, the treatment includes:

Advection of contaminated fluid through the treatment unit;

Adsorption of the contaminants onto the reactive media;

Reduction of the metal catalyst (i.e., Fe), addition of $H_2O_2$ to facilitate the Fenton reaction, OH production, and subsequently, Oxidation of the contaminants by OH on or near the surface of the reactive media (reaction 3 in Table 2). This adsorption/reduction/oxidation treatment process can be used in both above- and below-ground water and wastewater treatment systems, as well as gaseous fluids.

The treatment process of the present invention is designed to enhance Fenton oxidation by increasing the Fe(II) available for the Fenton reaction. This is accomplished by adding a reductant such as sodium dithionite or hydroxylamine to reduce Fe(III) to Fe(II). For example, sodium dithionite ($Na_2S_2O_4$) dissociates to the hydrosulfite ion ($S_2O_4^{2-}$) (reaction 4), and then to two sulfoxyl radicals (.$SO_2^-$) (reaction 5). The sulfoxyl radicals then reduce Fe(III) to Fe(II) and reduces species of sulfite ($SO_3^{2-}$) or bisulfite ($S_2O_3^{2-}$) (reaction 6). There are several potential reductants that can be applied to reduce Fe(III). The addition of a reducing agent can be used in conjunction with Fe(II) or Fe(III) amendments to the reactive media.

Contaminated fluid flows through the reactive media, which comprises a sorbent, such as activated carbon. The contaminants adsorb on the activated carbon, resulting in purified fluid in the effluent of the unit. Contaminants are adsorbed, immobilized, and concentrated onto the activated carbon, which also contains iron capable of facilitating Fenton-driven oxidation reactions. Prior to oxidation, a reductant, such as sodium dithionite or hydroxylamine, is introduced into the activated carbon that reduces the iron oxides from (Fe(III) to Fe(II). The reduced form of iron, i.e., Fe(II), can participate in the Fenton reaction. Hydrogen peroxide, or other oxidizing agent that produces a hydroxyl radical, is introduced into the activated carbon and reacts with the Fe(II), yielding a hydroxyl radical (.OH), which subsequently oxidizes contaminants on or near the surface of the activated carbon. Ideally, the contaminant is oxidized and the activated carbon is regenerated. The reduction/oxidation steps can be repeated to accomplish the desired level of contaminant oxidation.

Currently, laboratory results have been obtained which demonstrate that enhancing the Fenton oxidation of MTBE in activated carbon with sodium dithionite or hydroxylamine is effective. The Fe(III) is reduced to (Fe(II), and subsequently is a reactant in the Fenton reaction. The extent of oxidation was greater than the base case involving hydrogen peroxide without a reductant.

Also, in a Fenton system, there are many reaction which occur simultaneously. For example, there are oxidation and reduction reactions involving the target contaminant(s) and other chemical intermediates which collectively degrade the target contaminant(s) to more acceptable products. Although each of these reactions has not been definitively identified, they are a part of the overall Fenton mechanism, as shown in Table 2.

TABLE 2

Chemical Reactions Involving Fenton Chemistry of Sodium Dithionite and Reduction of Fe(III)

| | |
|---|---|
| $H_2O_2 + Fe(II) \rightarrow Fe(III) + OH^- + \bullet OH$ | (1) |
| $H_2O_2 + Fe(III) \rightarrow Fe(II) + \bullet O_2^- + 2H^+$ | (2) |
| $\bullet OH + \text{Organic Compounds} \rightarrow \text{Products (CO}_2\text{, Cl}^-\text{, etc.)}$ | (3) |
| $Na_2S_2O_4 \rightarrow 2\ NA^+ + S_2O_4^{2-}$ | (4) |
| $S_2O_4^{2-} \rightarrow 2\ \bullet SO_2^-$ | (5) |
| $4\ \bullet SO_2^- + \equiv Fe(III) \rightarrow \equiv Fe(II) + 2SO_3^{2-} + S_2O_3^{2-}$ | (6) |

Oxidation

As described above, the Fenton mechanism, hydrogen peroxide reacts with Fe(II) to yield hydroxyl radical and Fe(III), as shown in Table 1, Reaction 1. The Fe(III) is reduced to Fe(II) via reaction with hydrogen peroxide, as shown in Table 1, Reaction 2. Reactions 1 and 2 cycle iron between the ferrous and the ferric oxidation states, producing hydroxyl radicals continuously until the hydrogen peroxide is fully consumed. These reactions may involve either dissolved iron (homogeneous reactions) or solid phase iron oxides (heterogeneous reactions). Since the hydroxyl radical is a powerful oxidant and reacts with compounds at near diffusion-controlled rates (Walling, 1975; Haag and Yao, 1992), hydrogen peroxide has been used to generate hydroxyl radical and oxidize undesirable contaminants in soils and aquifers (Watts et al., 1993; Ravikumar and Gurol, 1994; Yeh and Novak, 1995).

Reactions 1 and 2 indicate that the overall Fenton mechanism is acid generating. pH affects hydrogen peroxide stability (Schumb et al., 1955) and iron solubility. Oxidation efficiency is optimum under acidic conditions (Watts et al., 1991). In any oxidation system involving Fenton-derived hydroxyl radical, pH should be monitored, and steps taken to mitigate acidic conditions.

A similar reaction involving the hydrogen peroxide oxidation/reduction cycling of $Mn^{2+}$ and $MnOOH(s)$ is thermodynamically favorable (Pardiek et al., 1992) and kinetically fast, but does not yield hydroxyl radical, as shown in Table 1, Reactions 7 and 8. Naturally-occurring soil microorganisms contain enzymatic catalysts, such as catalase and peroxidase, which also readily decompose hydrogen peroxide without producing the hydroxyl radical. The reactions between manganese or enzymatic catalysts and hydrogen peroxide reduce the amount of hydrogen peroxide available for Fenton reactions. Numerous non-target chemical species present in solid and aquifers, both naturally occurring (i.e., $CO_3^{2-}$, $HCO_3^-$, $Cl^-$, etc) and anthropogenic (i.e., $H_2O_2$, mixed waste constituents, etc.), will also react with hydroxyl radical. The non-target chemical species scavenge hydroxyl radical which would otherwise oxidize the target contaminants. Hydrogen peroxide is generally present at high concentrations in Fenton systems and has a moderate reaction rate constant ($2.7\times 10^7$ L/mol-s; Buxton et al., 1988) and, therefore, is responsible for scavenging a significant fraction of hydroxyl radical produced in Fenton systems.

Oxygen is a significant byproduct of reactions involving hydrogen peroxide in soils or aquifers. Reaction 6 in Table 1 indicates that $O_2^-$ reacts with Fe(III) to yield $O_2$. In aqueous systems, the rapid rate of degradation of high concentrations of hydrogen peroxide, in conjunction with the relatively low solubility of dissolved oxygen, the formation of bubbles, i.e., oxygen gas, is certain. In the field applications of Fenton systems, the formation of gaseous oxygen in porous media may result in gas blockage of fluid flow.

A wide range of organic compounds of environmental significance and their reaction rate constants with hydroxyl radical have been reported (Haag and Yao, 1992; Buxton et al., 1988; Dorfman and Adams, 1973). Organic compounds that are common ground water, air and soil contaminants as Superfund Sites have relatively high reaction rate constants (i.e., $10^8$-$10^{10}$ L/mol-s), indicating their potential for oxidation by hydroxyl radical.

Adsorption

Any type of sorbent may be used in the process of the present invention, depending upon the contaminants to be removed from the water. The criteria for the sorbent are that it be capable of concentrating the contaminant sought to be treated/removed, and that it provide iron in some form for the Fenton mechanism during oxidation of the contaminant. The primary role of granulated activated carbon, as of any sorbent, in the process of the present invention is to immobilize and concentrate target compounds on the same surface on which the hydroxyl radical is produced. Subsequently, the target compounds on or near the surface of the sorbent are oxidized. In addition to activated carbon, which can be granulated, powdered, etc., sorbents for use in the process of the present invention include ion exchange resins, both anionic, cationic, or both, zeolites and other molecular sieves, alumina, silica, silicates, aluminum phosphates, and the like. One skilled in the art can readily determine which adsorbent is effective in adsorbing and concentrating a particular contaminant.

Granulated activated carbon is a preferred sorbent for removing organic compounds from waste streams. For example, the pore size distributions and surface chemistry for a given granulated activated carbon are directly related to the starting raw material and the activating conditions. pH and concentration of transition metals in the carbon vary and, therefore, affect the reactivity of oxidants in granulated activated carbons.

Granulated activated carbon, or GAC, is an amorphous carbon based material that exhibits a high degree of porosity. The extensive surface areas of GAC are distributed in a range of pore sizes: macropores, >50 nm diameter; mesopores, >2 nm and <50 nm; and micropores, which are less than 2 nm in diameter. The actual available surface are is a function of adsorbate and conditions of adsorption. Surface chemistry likewise plays a role in determining the actual capacity of the adsorbent. Adsorbent chemical properties are a function of the raw material employed to make the GAC (e.g., bituminous coal, wood, coconut shell, lignite, etc.), the type of furnace and conditions used in the manufacturing process. When adsorbate saturation occurs, adsorption ceases. GAC must be regenerated or reactivated before the adsorption process can continue in a cost acceptable manner.

The term "reactivation" refers to restoration of adsorptive properties by means similar to those involved in the production of GAC, generally by thermal processes. The term "regeneration" implies the use of processes other than those used in producing GAC, such as steam stripping, chemical oxidation, and solvent treatments.

The oxidant can be any conventional oxidizing agent that works through the Fenton mechanism for oxidizing contaminants. While hydrogen peroxide has been illustrated in the specific examples, any other oxidizing agent that produces hydroxyl radicals in the presence of iron can be used, including ozone, permanganate salts, persulfate salts, and the like.

Iron can be added to the sorbent to enhance the Fenton mechanism and, therefore, enhance hydroxyl radical production. The amount of iron will affect the ability to carry out Fenton reactions and, therefore, the iron concentration of the sorbent can be optimized. For example, the concentration of iron may be adjusted so that the density of iron sites (i.e., the spatial distribution of hydroxyl radical production sites) is similar to the density of sorption sites on the sorbent to assure the spatial probability of hydroxyl radical and contaminant interaction. One method of iron attachment to a sorbent involves raising the pH using a sodium hydroxide solution to precipitate ferric iron in the pores of the sorbent. Additionally, the use of other forms of iron and the use of chelators and ligand agents can be used to attach iron to sorbent surfaces. Alternatively, a solution of iron and oxidant can be perfused through the sorbent to oxidize contaminants adsorbed thereto.

The adsorption/oxidation process and associated enhancement steps described above is, thus, used in systems in which contaminated water can be diverted through a sorbent/iron treatment unit. Details of an adsorption/oxidation treatment process are provided below in the context of a hydraulic barrier in conjunction with a carbon/iron treatment unit, but this example is for illustrative purposes only and is not limiting of the invention. This treatment process can also be used in above-ground treatment systems and be constructed in existing or planned containment systems to serve as a pressure release mechanism to improve hydraulic control. For example, a containment system or hydraulic barrier can be designed to leak while meeting stringent ground water quality criteria. Other applications include a below grade pump and treatment system, a passive landfill leachate treatment system, or any above ground treatment process.

Field Application in a Hydraulic Barrier/Treatment Unit

Flow blockage through the granulated carbon/iron medium may be a limitation of the process. For example, the reaction product oxygen (Reactions 6, 8 and 9 in Table 1) will result in gas formation which may fill the void spaces and inhibit water flow. This problem can be avoided using an upflow regimen allowing gaseous oxygen bubbles to rise in the carbon/iron unit and escape into the headspace of the unit or distribution gallery and into the air. Manganese oxide may be used to ensure that all hydrogen peroxide is consumed after it leaves the reactive media. This step minimizes the introduction of hydrogen peroxide into the distribution gallery. Biofouling may occur because of the high surface area and substrate concentration associated with the granulated activated carbon. However, biofouling in injection wells for in situ bioremediation have been remedied with hydrogen peroxide and, therefore, may not be a problem. Precipitation of solid phase material may result in fouling of the carbon/iron unit. The occurrence of this potential problem will be site specific. Precipitation may be eliminated by treatment with dilute acid. Alternatively, since the Fenton mechanism is acid generating, this may be sufficient to dissolve any precipitate which forms on the granulated activated carbon. The acid generating Fenton mechanism may release excess acid from the treatment unit. Two approaches are described below which may be used to maintain a constant pH from the treatment unit. While potential limitations on the process exist, the potential effects on treatability, operation and maintenance and the associated costs must be evaluated on a site-specific basis.

Limited treatment volume, hydroxyl radical scavenging, low reaction kinetics, and non-productive hydrogen peroxide consumption may reduce the effectiveness of hydrogen peroxide application in soil slurry reactors. These limitations are minimized in the treatment system of the present invention. For example, contaminants partition from the ground water onto the carbon/iron medium, thus achieving stringent treatment criteria. Through this process, contaminants are concentrated on the carbon/iron reactive medium which enhances reaction kinetics. Further, hydrogen peroxide is applied in a scavenger-reduced solution to minimize the role of scavengers in the treatment unit. Flow blockage and pH reduction may also result, but design options can be implemented to minimize these potential limitations.

Sorption/Oxidation System Design

Cross-section and plan-view diagrams of a hydraulic barrier and treatment unit according to the present invention illustrate the hydraulic and treatment components of the proposed system, as shown in FIGS. 2 and 3. Contaminated water flowed into a gravel-filled collection gallery 20 and was directed through the carbon/iron treatment medium 21. The ground water then passed through the hydraulic barrier 22 via a pipe 23 and back into the aquifer, through a gravel filled distribution gallery 24. The collection and distribution galleries facilitate water flow since head loss is minimized in gravel relative to the head loss through the porous medium. The combined head loss through the alternative flow regimen must be less than the head loss of the original flow regimen to ensure continuity and to minimize ground water flow stagnation. For example, the equivalent porous medium of the alternative flow regimen is comprised of the collection/distribution galleries, pipe flow, and treatment unit. The influence of the hydraulic barrier, collection/distribution galleries and treatment unit on the water gradient, flow pattern and capture zone must be evaluated on a site-specific basis.

Using contaminated ground water as an example, ground water flow in the pipe through the hydraulic barrier provides minimal disturbance to the wall. Since the system can be constructed below ground and is gravity driven, it is not subject to freezing or power outages (O'Brien et al, 1997). The granulated activated carbon/iron medium can be readily accessed for sampling or replenishment if necessary. Because of the oxidation of sorbed contaminants, ideally the granulated activated carbon is regenerated in situ, and replenishment may be unnecessary. The granulated activated carbon/iron medium can be slurried, pumped and remixed in the treatment unit if recycling of the granulated activated carbon/iron medium is determined to be beneficial.

Contaminants adsorbed to the carbon/iron medium were oxidized via hydrogen peroxide perfusion at selected intervals. Hydrogen peroxide was introduced by gravity into the system through a port at the surface which leads to a slotted distribution header 25 at the bottom of the carbon/iron unit. Gaseous oxygen formed in the carbon/iron unit will rise because of buoyancy and will escape into the headspace of the reactor unit, where it is vented into the atmosphere. The particle size of the activated carbon should be large enough to ensure mobility of gas bubbles in the carbon/iron medium and to minimize head loss. Assuming oxygen bubbles are diverted to the distribution gallery, an open chamber can be designed which will allow separation of bubbles and water. Passive gas capture and venting designs may also be used. It is undesirable to introduce hydrogen peroxide into the gravel-filled distribution gallery, since hydrogen peroxide decomposition and oxygen blockage may result. To ensure that hydrogen peroxide is degraded prior to leaving the reactor unit, a layer of manganese oxide ore or manganese-rich granulated activated carbon can be installed above the carbon/iron bed to rapidly decompose the remaining hydrogen peroxide and ensure that no hydrogen peroxide will be introduced into the distribution gallery.

Laboratory results indicate that the Fenton mechanism is an acid-generating process. This is consistent with Reactions 1-2 shown in Table 1, which indicate a net production of hydrogen ion. Acid production may be problematic, and its control at field scale may be advantageous. Different approaches can be used to control the pH in the oxidation system. A layer of limestone placed on top of the sorbent/iron unit and/or in the distribution gallery will neutralize a low pH solution. Another pH control method uses an automated pH-stat. This system comprises continuous pH measurement and adjustment of pH using an acceptable source of base, such as sodium hydroxide. It is important to note that oxidant perfusion into the treatment unit occurs infrequently, and the volume of water relative to the volume of water between oxidation events is small. Therefore, pH control may be necessary only when the treatment unit is undergoing oxidation. One option, of course, is simply to remove the solution containing spent oxidant for disposal or treatment elsewhere.

Monitoring treatment performance involves an upgradient well in the influent area and one downgradient well in the effluent area. A well 26 in the upper treatment unit could be useful for obtaining ground water quality data on the treatment unit. Specifically, monitoring for the contaminant provides information on breakthrough of the carbon/iron unit and indicates when oxidation is required. This information is helpful in establishing an oxidation schedule. Further, assuming halogenated contaminants were present, monitoring chlorides concentration in the treatment bed using monitoring well 27 during an oxidation treatment is useful in determining when oxidation is complete. For example, assuming the treatment bed is operated in batches or continuously, chloride concentration would eventually diminish as sorbed contaminants are oxidized. This simple monitoring system can be used to verify that the water quality leaving the treatment unit satisfies ground water quality cleanup goals.

Oxidation of sorbed contaminant occurs when an oxidant is perfused through the sorbent/iron unit. This is accomplished by, for example, introducing hydrogen peroxide into a port at the surface. The hydrogen peroxide then flows downward and out of a slotted distribution header and into the sorbent/iron media, as shown in FIGS. 2 and 3. Perfusing hydrogen peroxide can be effected either in continuous flow or in batch modes. The sorption/oxidation treatment system can be designed as two parallel units. For example, when hydrogen peroxide is perfused through one sorbent/iron unit, contaminants in the water can be treated via the second sorbent/iron unit. This provides the flexibility of operating one unit in a sorption mode and one unit in an oxidation/standby mode to ensure complete use of hydrogen peroxide. Other design configurations are also possible, such as series, batch, or continuous. The design options are also applicable to above-ground treatment systems.

The frequency at which oxidant is applied and the concentration depends on the mass loading rate, the mass of sorbent and treatment efficiency. The treatment efficiency depends on numerous parameters, including pH, hydrogen peroxide concentration, iron concentration, contact time, scavenging, non-productive oxidant degradation reactions, reaction rate constants, concentration of target compounds, etc. These parameters vary significantly from site to site, and the frequency necessarily reflects such variability.

There are several advantages to adsorbing contaminants in contaminated fluids onto iron amended sorbent and subsequent oxidation via the Fenton mechanism. In situ treatment of contaminants minimizes water pumping and associated costs. The process involves contaminant destruction, not simply mass transfer onto the sorbent, which requires subsequent handling for transport and treatment or disposal. Ideally, the sorbent is regenerated each time oxidant is applied, although the sorption capacity will not be completely restored to that of virgin sorbent. Mixed wastes can be sorbed and oxidized, since a wide range of organic compounds sorb to activated carbon and react with hydroxyl radical. Since co-disposal of organic compounds is common, a ground water plume or contaminated air comprised of contaminants, such as halogenated volatiles, polycyclic aromatic hydrocarbons, and fuel compounds (BTEX), can be treated together. Significant process control can be achieved in the system, including concentration and hydraulic retention time of oxidant and type of sorbent (particle size, oxidant reactivity, manganese content, contaminant sorption, iron concentration, etc.). Performance monitoring can be simplified since ground water wells can be placed directly in the collection and distribution galleries for pre-treatment and post-treatment evaluation, respectively. Significant treatment efficiency can be obtained, since the process involves a concentration step, minimizes the role of scavengers, and optimizes pH, since many oxidants can be used in dilute solution and since the Fenton mechanism is acid generating. The entire system can be gravity driven, including the delivery of oxidant. Thus, there need be no above-ground structures and iron, oxidants and sorbents are relatively inexpensive. This collectively minimizes costs.

The loss of iron in the sorbent may potentially be a concern in low pH or redox conditions. Preliminary experiments indicate that iron mobility does not occur except at pH<2.5. Assuming the pH in the treatment unit is maintained above 3, iron mobility can be limited. Iron contained in the mineral matrix of carbon is immobile relative to iron amended to the carbon.

Another potential problem may result in ground water contaminated with $Cr^{3+}$. Assuming $Cr^{3+}$ is present in contaminated water, it may possibly accumulate in the treatment unit and be oxidized to $Cr^{6+}$ upon application of hydrogen peroxide. This may increase the mobility and toxicity of chromium. It may be preferable to avoid treating water that is contaminated with such heavy metals by the process of the present invention.

Air Phase Treatment

The adsorption/oxidation process of the present invention involves two main modes or process operation, adsorption of the contaminants and the subsequent oxidation of the contaminants. Adsorption of contaminants can occur by passing a fluid stream, either liquid or gas, through the activated carbon or by other contacting regimes (i.e., batch) wherein the contaminants adsorb or partition onto the activated carbon. Activated carbon is used to purify fluids, either air or liquid. In the adsorption/oxidation process, adsorption of contaminants onto the activated carbon can occur from either liquids or gases. Oxidative treatment of the carbon, i.e., the regeneration process, involves liquid phase oxidative treatment. The carbon used in gas phase treatment must be dried, either bypassing air or dehumidified gas through the treatment reactor. That is, contaminant adsorption occurs from either gas or liquid contact with the activated carbon, and contaminant oxidation occurs from liquid phase oxidative treatment of the activated carbon.

Most of the contaminants adsorbed onto activated carbon from the gas phase are classified as hazardous waste. Much of the activated carbon used for air phase adsorption is therefore classified as hazardous waste and is not regenerated. Rather, it is sent to costly, secure hazardous waste landfills, incurring transportation and waste disposal costs. The adsorption/oxidation treatment process can be implemented on-site and in situ, therefore minimizing these types of costs. Small and large users of activated carbon can benefit from this treatment process.

In-Situ (in the Ground) Versus In-Situ (in the Tank)

The adsorption/oxidation treatment process can be implemented in-situ (underground) in conjunction with an impermeable boundary system (slurry wall, grout curtain, sheet piling, etc.). This involves the use of a carbon adsorption reactor in the subsurface through which the contaminated ground water is diverted. The purified effluent from the reactor is transported through the impermeable boundary and discharged to the down gradient side of the impermeable boundary. The effluent from the carbon adsorption reactor is sampled at the surface through a pipe connected to either the effluent line from the reactor or directly from the carbon bed. Sampling is controlled through valves, controlled at the surface or in-situ, that hydraulically open or close. The influent can be sampled in a similar manner. Regeneration can be in a mixing tank in-situ or an above-ground tank that is hydraulically connected to the carbon adsorption reactor. Recirculation, amendment of oxidant reagents, sampling, and the like, can be accomplished using pumps and valves. Gasese produced can be vented using either a gas phase carbon adsorption unit in-situ or above-ground. Additionally, the gases can be vented to the atmosphere, assuming that this is acceptable to the appropriate regulatory agencies.

Carbon Protection via Partial Regeneration

Sequential oxidation treatments of activated carbon can alter the physical and chemical characteristics of the carbon. In a laboratory study, Fenton oxidative and reductive treatment solutions were applied to granular activated carbon (GAC) to regenerate the adsorbent chemically. No adsorbate was present on the GAC physicochemical effects from chemically aggressive regeneration could be distinguished from the potential effects of accumulation of retention byproducts (Huling et al., 2003a). Fifteen sequential oxidation treatments with hydrogen peroxide, and fifteen sequential reduction/oxidation treatments with hydroxylamine and hydrogen peroxide on iron-amended GAC were evaluated. The GAC iodine number, $N_2$, BET surface area, microporosity, and total porosity declined with sequential treatments, but meso- and macroporosity essentially remained unchanged. Similar changes in iodine number, surface area, and pore volume distribution with either treatment suggest that the effects of the treatment are functionally dependent on oxidation and independent of hydroxylamine reduction. An inverse relationship was established between the number of chemical treatments and contaminant (methyl tert-butyl ether, 2-chlorophenol, trichloroethylene) adsorption. Loss in sorptive capacity was attributed to the combined and undifferentiated effects of reductions to microporosity and surface area, alterations in surface chemistry (overabundance of surface oxides), and, to a lesser degree, microspore blockage by iron oxides.

In another laboratory study, methyl-tert-butyl ether (MTBE) spent granular activated carbon was chemically regenerated using the Fenton mechanism, and minimal impact of the physical and chemical characteristics of the carbon was observed (Huling et al., 2003b). Two successive GAC regeneration cycles were performed involving iterative adsorption and oxidation processes: MTBE was adsorbed to the GAC, oxidized, re-adsorbed, oxidized, and finally re-adsorbed. Oxidant solutions composed of hydrogen peroxide (1.7-2.0%) and iron ($FeSO_4 \cdot 7H_2O$, pH 2.5) were applied and recirculated (upflow) through the GAC column at a rate sufficient for 30% bed expansion. The cost of hydrogen peroxide was $0.27/lb GAC, and regeneration efficiency after two full cycles of treatment was estimated to be 100% or 94%, depending on the method used to calculate regeneration. Reaction byproducts from MTBE oxidation included tertiary butanol and acetone. These byproducts were also degraded and did not accumulate significantly on the GAC or volatilize from the treatment system. Excessive accumulation of iron on the GAC and potential interference in the regeneration process were controlled by monitoring and adjusting iron concentration in the oxidative solution. Small reductions in surface area and pore volume distribution resulted from the oxidative treatment. No measurable deterioration of the adsorptive capacity of the GAC was measured as a result of oxidative treatments.

Oxidative treatments in a recent study (Huling, 203b) resulted in small changes in microporosity, meso- and macroporosity, and total porosity. These changes are attributed to the protection provided through reactions between *OH and adsorbate rather than between *OH and carbon surfaces. The strength and number of oxidative treatments required to accomplish an acceptable level of regeneration must be optimally balanced with the anticipated effects on the sorptive characteristics of the activated carbon. For example, in the study referred to here, the second regeneration cycle was terminated while 8% of the initial MTBE mass remained on the carbon. While this limited the mass of MTBE that can be re-adsorbed, it avoided both the increasing incremental costs required to eliminate the last 78% of MTBE mass and the loss of GAC protection offered by eh adsorbate. In thermal regeneration, similar optimization of process parameters (time of thermal treatment, temperatures, steam versus carbon dioxide, etc.) is required to develop a balance between deterioration (carbon gasification, loss of pore structure and surface area, etc.) and regeneration.

Regeneration Process and Apparatus

GAC adsorption systems typically employ multiple contactors in series, although multiple columns in parallel are also used. Fixed bed adsorption columns can be operated in either upflow or downflow mode. For purposes of the present invention, it will be assumed that a fixed bed adsorption system operating with four columns in series operating in downflow mode for contaminant adsorption and upflow for carbon regeneration, will be used.

As wastewater passes though the GAC in the carbon adsorption reactor, contaminants are continuously removed. Eventually the GAC in the lead column is exhausted in terms of ability to adsorb contaminants. At this point, breakthrough of contaminants occurs, and the second column in the series now assumes the task of removing contaminants. Complete breakthrough of the adsorbate is ideal, because this uses the full adsorptive capacity of the GAC and greater oxidative treatment efficiency can occur with higher adsorbate concentrations due to competition kinetics. Once the breakthrough occurs, column 1 is taken off-line and column 2 becomes the lead GAC column. Columns 3 and/or 4 operate as stand-by and polishing GAC adsorbers. Meanwhile, the spent carbon in column 1 is regenerated by the Fenton process. When the GAC in column 1 is regenerated, it is returned to service in the series of carbon columns. The degree of regenerative treatment may determine the position of the regenerated carbon reactor in the series of columns. For example, assuming some residue of contaminant remains on the surface of the GAC for reasons described above, the reactor may be returned to the first position to prevent elution of low concentrations of the adsorbate from the treatment system in the effluent. Despite the low residual under this set of conditions, significant sorptive capacity is available for adsorbate removal. Assuming complete removal of adsorbate during oxidative treatments, the regenerated carbon reactor could be placed either as the lead or polishing position in the treatment system.

A similar process of adsorptive and oxidative treatment can be used for two, three, or more than four carbon adsorption reactors in series.

A. Upflow to Fluidize the GAC

In the adsorption mode, fluid may travel either in upflow, downflow, or sideflow. During the oxidative mode, recirculation of the regenerative solution can also occur in any of these flow regimes. However, there are distinct advantages to the upflow mode. The upflow hydraulic regime expands and fluidizes the carbon bed. The degree of bed expansion and carbon fluidization or suspension is controlled by the rate of upflow during recirculation.

Upflow of the regenerative solution reduces abrasion of carbon particles by increasing the distance between carbon particles, thus avoiding collisions between particles. Abrasion of carbon particles from collisions results in the reduction of particle size of the GAC and formation of small or colloidal sized particles, both of which are undesirable. The upflow hydraulic regime and the fluidization of the carbon particles permits gaseous oxygen formed during the Fenton reaction to easily pass through the carbon bed. Under a non-fluidized flow regime, clumping and bridging of GAC particles contribute to the formation of gas and liquid pockets, "burping" of gaseous oxygen, and pulsing of water through the column. Under a fluidized flow regime, (i) gaseous oxygen is easily eliminated from the reactor, (ii) GAC chunks and clumping are broken up, (iii) more uniform flow of liquid occurs through the reactor, and (iv) better contact occurs between fluid and particles. This allows greater exchange of oxidants and reagents into the micropores, and adsorbate and reaction byproducts from the micropores. Recirculation of the regeneration solution and bed expansion should occur prior to applying hydrogen peroxide. Once hydrogen peroxide is applied, gaseous oxygen can more easily escape the reactor without purging water from the reactor into the mixing tank. The upflow hydraulic regime and bed expansion step (before oxidation) could also be used to eliminate biogrowth, inorganic particles, and floc material through backwashing. Backwashing for purposes of the present invention is a process in which water is pumped in an upflow mode and is eliminated from the reactor. Some of the materials eliminated by backwashing could behave as scavengers of *OH or reactants with hydrogen peroxide that reduce oxidation efficiency. Thus, this step also improves oxidation efficiency.

B. Recirculation reservoir

A recirculation reservoir or mixing tank can be used, but this is not critical to the carbon regeneration process. Regenerative reagents (e.g., acid, base, oxidant, reductant, iron salts) can be amended to the mixing tank and pumped and circulated through the activated carbon. The tank also provides the opportunity to collect samples of the regenerative solution to assess treatment performance. The mixing tank comprises a vessel capable of withstanding corrosive solutions, and is of sufficient volume to contain liquids that are inadvertently purged from the adsorption reactor.

C. Volatile Loss Carbon Trap

A wide array of environmental contaminants present in water and air streams are amenable both to separation by activated carbon and to transformation via the Fenton-driven mechanism. However, some of these compounds are also vulnerable to volatilization under the conditions of the regeneration hydraulic regime. Fugitive losses of volatile adsorbates from the treatment system is not permitted under most situations and must be controlled. This can be accomplished by using a carbon adsorption unit for gasses that are vented from the system. Volatile emissions from the treatment system are vented from the headspace of the mixing reservoir into a gas phase carbon adsorption unit. Alternatively, volatile emissions can be vented directly from the liquid phase carbon adsorption unit into a gas phase carbon adsorption unit. In this case, sufficient headspace is required in the liquid phase carbon adsorption nit to allow for bed expansion and freeboard for gas venting.

D. Temperature control

The Fenton reaction is exothermic, resulting in the release of heat energy to the recirculating solution. The amount of heat released and associated temperature increase can be controlled by adjusting the volume and concentration of hydrogen peroxide applied to the reactor system. Raising the temperature of the recirculation fluid can be useful in enhancing the rate of sorption, adsorption, desorption and oxidation. This can also be controlled by applying external source of heat to the treatment system, including to the reactor, mixing tank, and circulation lines.

Post-Oxidation Carbon Treatment

Post-oxidation carbon treatment with a base solution, such as NaOH, KOH, $NaHCO_3$, $Na_2CO_3$, etc.) after the acidic oxidative treatments can be used to reduce the surface acidity and restore some of the adsorption capacity lost due to the accumulation of surface acidity from oxygen containing functional groups.

Reduction Transformations

In the Fenton reaction, one of the reaction intermediates is the superoxide radical, $*O_2-$, or the perhydroxyl radical, $*HO_2$, pKa=4.8. these chemical reductants are involved in the reduction of Fe(III) to Fe(II). This is an important mechanism in the cycling of iron between oxidation states and the role iron then has as a Fenton reaction catalyst. Further, these reductants and Fe(II) are capable of carrying our reductive transformations of contaminants in the carbon adsorption reactor. Therefore, the adsorption/oxidation treatment process involves both oxidative and reductive treatment of the adsorbate.

Optimal Iron Levels

Optimal iron levels in the activated carbon is used to maximize the role of iron in the Fenton reaction, as well as to minimize the role it may have in blocking sorption sites or interfering in the transport of oxidant reagents, adsorbate or reaction byproducts to and from micropores. The treatment efficiency, defined as the molar ration of $Cl^-$ released to hydrogen peroxide consumed, of 2-chlorophenol, increased with increasing amounts of iron oxide in the GAC (Huling et al., 2000). The amount of iron on the GAC that is optimal varies for different carbons because of the porous structure of the different GACs. However, for the activated carbon used in the examples herein, 7-15 g/kg was found to be optimal.

Powdered Activated Carbon

Powdered activated carbon (PAC) can be used for gas or liquid treatment. The adsorption/oxidation process can be used in PAC systems where adsorption of contaminants occurs through a batch reactor or a continuously stirred tank reactor. The oxidation step can also be applied under these reactor configurations. Dissolved or particulate forms of iron in conjunction with hydrogen peroxide are amended to the adsorption reactor and mixed.

METHODS, MATERIALS AND ANALYTICAL PROCEDURES

Sorption

The reactors used were 125 mL Ehlermeyer flasks containing 1.0 gram granulated activated carbon and 40 mL 6 mM solution of 2-chlorophenol. The reactors were placed on an orbital shaker table for 24 hours, which allowed complete (>99%) sorption of 2-chlorophenol. The granulated activated carbon slurry was decanted, and the solutions were analyzed for chloride ion, 2-chlorophenol, and total iron ($Fe_T$).

Oxidation

The remaining granulated activated carbon was amended with 100 mL hydrogen peroxide, of 0.7%, 0.9%, 1.2%, or 7.2%, w/w concentration, or deionized water in three successive applications, unless otherwise noted. The reactors were wrapped in foil to prevent photodecay, covered with parafilm to minimize volatile losses and evaporation, and placed on an orbital shaker table at 100 rpm. The granulated activated carbon slurry was decanted, and the solution was analyzed for hydrogen peroxide, chloride ion, 2-chlorophenol, and $Fe_T$. Control reactors containing granulated activated carbon and hydrogen peroxide, but not 2-chlorophenol, were used to measure background chloride ion. The pH of 2-chlorophenol control solutions was adjusted to between 2 and 7 and the solutions were analyzed for 2-chlorophenol. These data indicated no transformation.

The granulated activated carbon slurry pH was measured by placing a pH probe (Orion Sure-Flow ROSS Combination pH) into the slurry for five minutes to instrument stabilization. Samples were collected by pipetting 1.5 mL from a completely mixed suspension and filtered using a Gelman 0.2 µm filter which stopped all reactions and removed colloidal particles interfering with subsequent analyses. Hydrogen peroxide was measured immediately, and 2-chlorophenol subsamples were stored at 4° C. for analysis when the experiment was completed. The 2-chlorophenol was obtained from Aldrich Chemical. EXP3 granulated activated carbon is commercially available bituminous-based carbon obtained from Calgon Chemical Corp. (Pittsburgh, Pa.). EXP4 granulated activated carbon was derived from the same stock of Bakers carbon but was activated differently to minimize degradation of hydrogen peroxide (Rich Hayden, personal communication, 1997). Two additional granulated activated carbons were obtained from Norit America, Inc., Pryor, Okla. (type A4) and Carbochem, Inc., of Haverfers, Pa., (type LQ-900S). The particle size distribution was 8×30 for all granulated activated carbons.

The iron content of Calgon Chemical Corp. (special) granulated activated carbon was enhanced at low, medium, and high concentrations by mixing 15 grams granulated activated carbon into solutions comprising 38 mL and 0.744, 3.73, and 6.44 grams $FeSO_4 \cdot 7H_2O$, respectively. Ferrous iron was precipitated by adjusting the acidic solution to pH 5.5 with sodium hydroxide. The slurry of granulated activated carbon and iron was filtered and rinsed with deionized water through a number 35 sieve which retained >99.99% of the granulated activated carbon. The granulated activated carbon was air dried and placed into 40 mL glass vials until used. Representative samples of the granulated activated carbon/iron stock were analyzed by inductively coupled argon plasma after metals were extracted from the granulated activated carbon by digesting a 0.25 gram sample in 40 mL of 19% nitric acid for 40 minutes in a microwave oven at 150° C. and 145 psia.

Analyses of 2-chlorophenol were performed by a Waters high performance liquid chromatography Alliance Separations Module (Model No. 2690) using a Waters 996 Photodiode Array detector and a Nova-Pak C18 stainless steel column. The mobile phase was 30% acetonitrile and 0.3% acetic acid in deionized water, the flow rate was 1.0 L/min, and the injection volume was 199 µL. The wavelength used was 200 nm and the average retention time was 5.5-5.8 minutes. The 2-chlorophenol standard curve ranged from 0 to 400 µM, $r^2=0.999$, 0.14 µM detection limit. Check standards, blanks, duplicates, and spikes were run with each sample set, and the analytical quality was found to be in control.

Hydrogen peroxide was analyzed using a modified peroxytitanic acid calorimetric procedure. Hydrogen peroxide standards ranged from 0-3 mM, $r^2=0.999$, detection limit=0.1 mg/L; 0.9 mL of the standard hydrogen peroxide solution was added to 0.1 mL of titanium sulfate reagent and allowed to react for one hour. Appropriate dilutions were made of solution where the concentration exceeded the range of the reported calibration curve. Filtered granulated activated carbon slurry samples in triplicate were prepared in a similar manner. Absorbance of the hydrogen peroxide-titanium sulfate mixture was measured at 407 nm ($A_{407}$) using a Milton Roy Spectronic 401 spectrophotometer. Regression analysis of the spectrophotometric response and the hydrogen peroxide concentration yielded a standard curve with an analytic equation of $[H_2O_2]$ (mg/L)=44.5 $A_{407}$, $r^2=0.999$. Titanium sulfate reagent was obtained from Pfaltz and Bauer, Inc., and the 30 w/w % aqueous solution of hydrogen peroxide was from the Aldrich Chemical Company. Chloride ion was analyzed by Waters capillary electrophoesis method N-601 Cl. Iron was analyzed by EPA Method No. 3500-Fe D, Phenanthroline method. Transformation products of 2-chlorophenol on the granulated activated carbon were identified using gas chromatography and mass spectroscopy. This analysis involved a derivatization technique using N-methyl-N-[(tert-butyldimethyl)silyl]trifluoroacetaminde from Aldrich Chemical Co., Milwaukee, Wis., which yielded tert-butyl-dimethylsilyl ethers and esters (Heberer et al, 1997; Mawhinney 1983; Mawhinney et al, 1986). For each treatment, 100 µL of acetonitrile and 100 µL of N-methyl-N-[(tert-butyldimethyl)silyl]trifluoroacetaminde were added to 10 mg of the granulated activated carbon sample. This mixture was heated for one hour at 60° C. 2-chlorophenol, carbonic acid, sulfuric acid, and eleven dioic and hydroxy acids were derivatized to confirm the identification of the reaction products. Derivatized extracts were injected into a Finnigan 4600 gas chromatograph/mass spectrometer. A Hewlett Packard 7673 autoinjector delivered 1.0 µL of the extract under splitless conditions onto a J&W Scientific, DB5-MS capillary column (60 m; 0.25 mm id; 0.25 µm film thickness). The column was temperature programmed from 100° C. to 300° C. at 6° C./minute. The mass spectrum was scanned from 42 to 650 m/z in 0./5 seconds. The injection and transfer oven temperatures were 275° C.

The treatment ratio, T.R., was calculated as the ratio of moles of contaminant oxidized to the number of moles $H_2O_2$ consumed over the same time frame (i.e., $\Delta Cl^-/\Delta H_2O_2$). The number of moles of 2-chlorophenol oxidized was assumed to be stoichiometrically 1:1 to chloride ion measured in solution and corrected for background.

RESULTS

The concentration of total iron and manganese in commercially available granulated activated carbon varied significantly, from 24.0 to 5520 mg/Kg and 0.55-94.3 mg/Kg, respectively, as shown in Table 3. These data also indicated that total iron can be significantly increased, i.e., by a factor of 230-500.

Metals analyses data indicate that total Fe was significantly increased using the Fe precipitation method (Table 2). Total Mn concentration on the GAC was significantly less than total Fe. Analysis of the GAC, via ICAP, involved a digestion step, and, therefore, the Fe and Mn concentration data represented total Fe and Mn rather than available Fe and Mn for reaction. It is unclear what fraction of the total Fe or Mn was available to react with $H_2O_2$. Although limited Mn concentrations were measured for the GAC reported here, analysis of other GACs involved in similar studies in laboratory of the present inventors indicates that total Mn concentrations are much higher in other GAC and provide a plausible, non-productive sink for $H_2O_2$ (data not shown).

TABLE 3

Metal Analysis Results of GAC via ICAP

| Granulated Activated Carbon (Calgon Chemical Corp.) | Metal Concentration (mg/Kg) (n = 2) | |
|---|---|---|
| | Fe | Mn |
| F-300 type | 1130 | 3.6 |
| EXP-4 | 24.0 | <0.55 |
| EXP-4 low* | 5500 | <0.7 |
| EXP-4 med.* | 9790 | 3.0 |
| EXP-4 high* | 12050 | 5.1 |

*low, med. and high iron concentration on the GAC resulted from iron amendment

Addition of Fe to EXP4 carbon was performed for the purposes of enhancing oxidation and improving treatment efficiency. Three Fe concentrations were evaluated (low, medium, high) (Table 4). The baseline total Fe concentration in EXP4 GAC was 24.0 mg/Kg. $H_2O_2$ degradation conformed to pseudo first-order kinetics and was greatest in the unamended (Fe) GAC. Despite the low Fe concentration on the unamended GAC, greater initial slurry pH contributed to increased $H_2O_2$ degradation. In the Fe amended GAC, $H_2O_2$ half-lives decreased, and total $Cl^-$ recovery and TR increased with increased Fe concentration.

TABLE 4

Effect of GAC Iron Concentration on Treatment Ratio in Calgon Chemical Corp. EXP4 GAC Three Applications of 100 mL $H_2O_2$

| GAC[1] | [Fe$_T$] (mg/Kg) | $H_2O_2$[2] $t_{1/2}(hr_{-1})$ | pH$_i$, pH$_f$ | $\Sigma Cl^-$[3] (moles) | Treatment Ratio[4] ($\times 10^{-4}$ mole/mole) |
|---|---|---|---|---|---|
| ExP4 (none) | 24.0 | 4.5, 4.2, 5.9 | 5.5, 4.4 | $1.1 \times 10^{-5}$ | 1.4 |
| ExP4 - low | 5500 | 7.1, 9.4, 11.4 | 4.6, 3.3 | $2.9 \times 10^{-5}$ | 4.4 |
| ExP4 - med | 9790 | 6.8, 7.5, 7.7 | 4.6, 3.1 | $5.0 \times 10^{-4}$ | 6.9 |
| ExP4 - high | 12050 | 5.6, 5.5, 5.7 | 4.6, 3.1 | $6.0 \times 10^{-4}$ | 7.8 |

(1)[2CP]$_i$ = 35.4 g/Kg
(2)avg. (n = 3) [$H_2O_2$]$_{initial}$ = 9222, 9370, 9420, 9340 mg/L
(3)$\Sigma Cl^-$released corrected for background $Cl^-$
(4)$\Sigma Cl^-/\Sigma H_2O_2$ (avg. n = 3)

The low initial slurry pH in Fe amended reactors is attributed to the acidity associated with $FeSO_4 \cdot 7H_2O$ used to alter the Fe content of the GAC. The pH decline with time may be attributed to different mechanisms: acid production associated with the Fenton mechanism; hydrogen ion release from the oxidation of 2 CP; and production of acidic compounds, such as carboxylic acids. Since the solubility of ferrous Fe is inversely proportional to pH, some Fe may become soluble (mobile) under acidic conditions. $Fe_T$ measured in unfiltered slurry samples (i.e., soluble or solid phase) containing GAC with 24.0 or 5500 $Fe_T$ mg/Kg was <1.0%, and with 9790 and 12050 $Fe_T$ mg/Kg, was 3 and 3.5%, respectively.

Three $H_2O_2$ concentrations (0.94, 2.1, 7.1% w/w) in conjunction with Calgon Chemical Corp. GAC EXP4 (low Fe) were evaluated with respect to 2 CP sorption and oxidation. The degradation rate of $H_2O_2$ conformed to pseudo-first order degradation kinetics and half-lives increased with increasing $H_2O_2$ concentration (Table 5). The overall $H_2O_2$ degradation rate decreased 60-78% with increasing $H_2O_2$ application to the GAC. The decrease in $H_2O_2$ degradation rate may be partially attributed to the decrease in pH; however, the precise mechanism is unknown.

TABLE 5

Effect of Hydrogen Peroxide Concentration on the Adsorption and Oxidation Treatment Efficiency in Calgon Chemical Corp. EXP4 GAC Low Iron
[Fe$_T$] = 5500 mg/Kg); 35.4 g/Kg 2CP;
Three Applications of 100 mL $H_2O_2$

| [$H_2O_2$]$_i$ (M) | $H_2O_2$ $t_{1/2 (hr}^{-1})$ | pH$_i$, pH$_f$ | $\Sigma Cl^{-(1)}$ (moles) | Treatment Ratio[2] ($\times 10^{-4}$ mole/mole) |
|---|---|---|---|---|
| 0.28 | 7.1, 9.4, 11.4 | 4.4, 3.3 | $2.9 \times 10^{-5}$ (11%) | 1.3, 5.4, 7.4 (4.7) |
| 0.63 | 8.9, 13.6, 15.8 | 4.6, 2.9 | $9.1 \times 10^{-5}$ (33%) | 3.1, 8.1, 9.8 (7.0) |
| 2.1 | 17.1, 27.0, 29.4 | 4.6, 2.7 | $1.5 \times 10^{-4}$ (55%) | 3.1, 5.7, 3.6 (4.1) |

(1)$\Sigma Cl^-$ released corrected for background $Cl^-$, percent chloride recovery from 2CP in parentheses
(2)$\Sigma Cl^-/\Sigma H_2O_2$ for each application; average in parentheses An increase in [$H_2O_2$] will increase [—OH] linearly as per the source term in eq 2 (i.e., $k_2$ [Fe(II)] [$H_2O_2$]), and correspond to an increase in the rate of 2 CP oxidation (eq 1). However, increased radical scavenging may reduce treatment efficiency. For example, increased concentrations of scavengers such as $Cl^-$ and $H_2O_2$ would increase the rate of scavenging (i.e., rxns 4 and 5) resulting in a nonlinear response in treatment efficiency. In these data, the TR increased between reactors containing 0.28 and 0.63 M $H_2O_2$, but either remained the same or decreased between reactors containing 0.63 M and 2.1 M $H_2O_2$ (Table 6). The increase in TR was partially attributed to pH since the final pH was lower. The decrease in TR was attributed to increased scavenging from $H_2O_2$ (i.e., greater Si). Reaction rate kinetics may have been limited during the last application of $H_2O_2$ (2.1 M). Overall, the extent of 2 CP oxidation, as indicated by total $Cl^-$recovery, increased with increased [$H_2O_2$], but it was less efficient at the higher $H_2O_2$ concentration (2.1 M).

TABLE 6

Effect of 2CP Concentration on the Adsorption and Oxidation Treatment Efficiency in Calgon Chemical Corp. EXP4 GAC

| $[2CP]_i$ (g/Kg) | $[Fe]_t$ (mg/Kg) | $CL^{-(1)}$ (moles × $10^{-5}$) | $H_2O_2$ (moles × $10^{-2}$) | Treatment Ratio[4] (×$10^{-4}$ mole/mole) |
|---|---|---|---|---|
| 2.4 | 24.0 | 0.34 | 2.1[2] | 1.2 (0.66–1.7) |
| 6.3 | 24.0 | 0.31 | 2.1[2] | 1.2 (0.54–2.0) |
| 11.8 | 24.0 | 0.45 | 2.1[2] | 1.4 (1.0–1.8) |
| 19.7 | 24.0 | 0.76 | 2.1[2] | 3.3 (2.5–4.1) |
| 31.5 | 24.0 | 1.2 | 2.1[2] | 6.0 (5.5–6.7) |
| 131 | 9790 | 7.6, 12.1, 8.3 | 1.6, 1.5, 1.3[3] | 47, 81, 64 |

[1]$\Sigma Cl^-$ released corrected for background $Cl^-$
[2]100 mL $[H_2O_2]_i$ = 0.21 M; $H_2O_2$ $t_{1/2}$ = 3.5 ($hr^{-1}$)
[3]Three applications of 100 mL $[H_2O_2]_i$ = 0.21 M
[4]$\Sigma Cl^-/\Sigma H_2O_2$ (95% confidence interval; lower interval value for TR = $\Sigma CL^-_{upper}/\Sigma H_2 P_{2lower}$, where $Cl^-_{lower}$–$Cl^-_{upper}$, and $H_2O_{2lower}$–$H_2O_{2upper}$ are the respective lower-upper 95% confidence interval concentration values for $Cl^-$ and $H_2O_2$, respectively The TR is influenced by the initial 2 CP concentration on the GAC (Table 6). Where the initial $H_2O_2$ and Fe concentrations and the soil slurry pH (5.5) were equal in five reactors, the data suggest an increase in oxidation efficiency was attributed to greater 2 CP concentration on the GAC. A statistically significant difference in TR was not observed at low concentrations (2.4-11.8 g/Kg). A significant increase in the TR was observed in the reactor where the initial 2 CP (131 g/Kg) and Fe (9790 mg/Kg) concentrations were increased and the average pH lower (3.1). In this reactor, it cannot be specifically determined what affect elevated Fe and 2 CP concentrations had on treatment efficiency, since the pH was lower. However, increased Fe and 2 CP concentrations on the surface of the GAC would result in a greater probability of reaction between 2 CP and .OH.

GC/MS analysis of GAC (EXP4 med., Table 4) was performed to identify decomposition products resulting from the oxidation of 2 CP. Controls were used to differentiate compounds extracted from GAC not attributed to 2 CP or its oxidation products. Carbonate and unknown nitrogen derivatives (CND) were extracted from the GAC indicating background compounds (Table 7). 2 CP and CND were found in the GAC where 2 CP was applied. Extraction of the Fe amended GAC yielded a tBDMS sulfate derivative (SD) in addition to 2 CP and CND. Under oxidizing conditions, several organic acid byproducts were measured. The most abundant were confirmed to be oxalic and maleic acids, while minor acids were identified as malonic and fumaric. Based on the mass spectrum, tentatively identified compounds include another abundant compound, 2-chloromaleic acid, and minor compounds included hydroxychlorobenzoic acid, two isomers of dihydroxychlorobenzene and a dimer of chlorophenol. Measurement of these chlorinated byproducts indicates that under oxidative conditions, transformation of 2 CP involved ring cleavage without the release of $Cl^-$. These results are consistent with Getoff and Solar (1986) who reported 2 CP oxidation via .OH yields byproducts which may include $Cl^-$ release, hydroxy benzenes (phenol, catechol, resorcinol, hydroquinone, hydroxyhydroquinone), dimers, and chlorinated isomers.

TABLE 7

GC/MS Analysis of GAC[1]

| $[Fe_T]$ (mg/Kg) | $[2CP]_i$ (g/Kg) | $[H_2O_2]_i$ (M) | Organic Compounds |
|---|---|---|---|
| 24.0 | — | — | carbonate and nitrogen derivatives (CND) |
| 24.0 | 35.4 | — | 2CP, CND |
| 9790. | 35.4 | — | 2CP, CND, sulfate derivative (SD) |
| 9790. | — | 9440 | CND, SD |
| 9790. | 35.4 | 9420 | 2CP, CND, SD, oxalic acid, maleic acid, 2-chloromaleic acid, malonic, fumaric acid |

[1]Calgon Chemical Corp. EXP4; 40 mL 2CP 6880 μM or 40 mL DI; three applications of 100 ml $H_2O_2$ or 100 mL. DI Sequential adsorption/oxidation was evaluated by adsorbing 2 CP to the GAC (Calgon Chemical Corp. EXP4, 5500 mg/Kg Fe) in three successive events using similar procedures (volume, concentration, equilibrium time), and oxidizing the GAC suspension between sorption events. $H_2O_2$ (100 mL, 0.59 M) was applied twice to the GAC (119 g/Kg 2 CP) and 62% of the $Cl^-$ from the sorbed 2 CP was recovered. 2 CP was re-adsorbed (90 g/Kg 2 CP), $H_2O_2$ applied (100 mL, 2.9 M) and 125% of the $Cl^-$ as 2 CP re-amended to the GAC was recovered. This was due to residual $Cl^-$ retained on the carbon after oxidation with 0.59 M $H_2O_2$. The overall $Cl^-$ recovery from both oxidations was 89%. 2 CP (97 g/Kg) was re-amended to the GAC. These data indicate that aggressive oxidation did not alter the GAC surface to a degree that significantly interfered with the 2 CP adsorption reaction.

Contaminants in water are adsorbed onto sorbents and oxidized in the presence of iron, which may be present on the sorbent or added with the oxidant, via Fenton-driven reactions. The selection of sorbent affects treatment effectiveness, since the concentration of oxidant reactants, such as iron and manganese, varies between manufacturers of granulated activated carbon. The iron content of the sorbent can be altered to enhance the Fenton-driven oxidation reactions. The rate and extent of oxidation depends on oxidant concentration, which affects hydroxyl radical concentration and scavenging. The efficiency of oxidation increases with increased contaminant concentration on the surface of the sorbent.

Additional experiments were conducted to investigate carbon regeneration using Fenton's mechanism. Carbons were loaded with 2 CP and amended with $H_2O_2$ solutions. Dependent variables included iron oxide loading on the carbon surface, 2 CP mass loading, and initial $H_2O_2$ concentration. Dependent variables included chloride ion concentration, pH, and time-dependent aqueous phase $H_2O_2$ concentration. Transformation byproducts from 2 CP oxidation were identified. To investigate the effect of Fenton-driven carbon regeneration on the affinity between 2 CP and carbon, sequential cycles of 2 CP adsorption and oxidation were carried out.

Effects of Iron Level, 2 CP Loading and $H_2O_2$ Concentration. For carbon adsorption of 2 CP, 11.0 g GAC was suspended in 40 to 160 mL of a 6.0 mM 2 CP solution. Reactors (Erlenmeyer flasks) containing the slurries were placed on an orbital shaker table for 24 hrs after which the 2 CP solution was decanted. Previous work (not shown) indicated that 24 hrs is sufficient for attainment of equilibrium partitioning of 2 CP between the liquid phase and carbon surface. Mass loadings were calculated based on initial and final measurements of 2 CP concentration in the carbon slurries. Oxidation was accomplished by amending the GAC with 100 mL $H_2O_2$(00.21, 0.28, 0.63, or 2.1M). The spent $H_2O_2$ solution was decanted after approximately 24 hrs. On one set of experiments, the process was repeated two more times to extend the number of adsorption/oxidation cycles. Reactors were wrapped in aluminum foil to prevent photodecomposition, covered with parafilm to minimize volatile losses and evaporation, and placed on an orbital shaker table (100 rpm). $H_2O_2$, $Cl^-$, pH, 2 CP, and total iron ($Fe_T$) concentrations were measured. Control reactors containing GAC and $H_2O_2$ but no 2 CP were used to measure and correct for background $Cl^-$ released from the GAC. The concentration of 2 CP (0.23 mM) was stable (>48 hrs) both in control solutions with varying pH (pH 2.4-7.7, 0.38 mM 2 CP) and in GAC— and Fe-free control reactors containing $H_2O_2$(0.15M).

Effects of Repeated Adsorption/Oxidation Steps. To establish the effect of repeated adsorption/oxidation on the subsequent adsorption of 2 CP, 1 g GAC was placed in 160 mL of a 6.0 mM solution of 2 CP. The solution was decanted after 24 hrs and amended with 100 mL of $H_2O_2$(0.59M) in two sequential (replicate) applications. The spent $H_2O_2$ solutions were decanted. The adsorption/oxidation steps were repeated using 160 mL of a 6.0M solution of 2 CP, except the $H_2O_2$ solution (100 mL, 2.9M) was applied once. Finally, the spent $H_2O_2$ solution was replaced with 2 CP solution (160 mL, 6 mM) for a third adsorption step.

GAC Preparation, Sampling, and Analytical. Samples (1.5 mL) were pipetted from a completely mixed suspension and filtered using a Gelman 0.2 µm filter to stop all reactions and remove colloidal particles. The filtrate was immediately sampled and analyzed for $H_2O_2$ and subsamples were stored at 4° C. and analyzed for 2 CP when each experiment was completed. Reagent grade 2 CP was from Aldrich Chemical.

2 CP analyses were performed using a Waters high pressure liquid chromatograph Alliance Separations Module (Model No. 2690) with a Waters 996 Photodiode Array detector and a Nova-Pak C18 stainless steel column. The mobile phase wsa 30% acetonitrile and 0.3% acetic acid in deionized (DI) water; flow rate was 11.0 mL./min; injection volume was 100 µL; $\lambda$=220 nm; average retention time was approximately 5.7 minutes. The 2 CP standard curve ranged from 0 to 400 µM, $r^2$=0.999, 0.14 µM detection limit. Check standards, duplicates, and spikes were run with each sample set.

$H_2O_2$ was measured using a modified peroxytitanic acid calorimetric procedure (Boltz and Howell, 1978) as decribed previously (Huling et al., 1998). The detection limit was 2.9 µM. Filtered samples from GAC slurries were prepared in triplicate and analyzed. $TiSO_4$ reagent was purchased from Pfaltz and Bauer Inc., and $H_2O_2$(30 wt.% solution in water) was purchased from the Aldrich Chemical Company. Chloride ion analyses was by Waters capillary electrophoresis Method N-601 $Cl^-$. Iron analysis of the filtrate solution was by EPA Method No. 3500-Fe D, Phenanthroline method.

Positive identification of 2 CP and Fenton-dependent transformation products on the GAC was accomplished via gas chromatography and mass spectroscopy (GC/MS) and involved a derivatization technique using N-methyl-N-[(tert-butyldimethly)silyl] trifluoroacetamide (MTBSTFA) (Aldrich Chemical Co., Milwaukee, Wis.) that yielded tert-butyldimethylsilyl (tBDMS) ethers and esters (Heberer et al., 1997; Mawhinney et al., 1983; 1986). For each treatment, 100 µL of acetonitrile and 100 µL of MTBSTFA were added to 100 mg of GAC. This mixture was heated for one hour at 60° C. 2 CP, carbonic acid, sulfuric acid and eleven dioic and hydroxy acids were derivatized to confirm the identity of reaction products. Derivatized extracts were injected into a Finnigan 4600 GC/MS. A Hewlett Packard 7673 auto-injector delivered 1.0 µL of the extract under splitless conditions onto a J&W Scientific, DB5-MS capillary column (60 m; 0.25 mm i.d.; 0.25 µm film thickness). The column was temperature programmed from 100° C. to 300° C. at 6° C./min. The mass spectrum was scanned from 42 to 650 m/z in 0.5 sec. The injection and transfer oven temperatures were 275° C.

The GAC slurry pH was measured using an Orion Sure-Flow ROSS Combination pH probe. The pH of the GAC suspension was not controlled during any of the experiments. Buffers were not used since they would introduce radical scavengers which may significantly affect oxidation efficiency.

EXP4 GAC was supplied by Calgon Carbon Corp. (Pittsburge, Pa.). EXP4 GAC was derived from the same starting raw material as F-300, a commercially available GAC, but activated differently by Calgon Carbon Corporation to minimize $H_2O_2$ reactivity (Hayden, 1998). Particle size distribution was 8×30 mesh for all GACs. Iron oxides were precipitated on EXP4 GAC at low, medium, and high concentrations by mixing 15 g GAC into solutions comprised of 38 mL of DI water and 0.744, 3.73, and 7.44 g $FeSO_4 \cdot 7H_2O$ was purchased from Johnson Matthey (Ward Hill, Mass.). The pH of the GAC suspension prepared with the acidic $FeSO_4$ solution was adjusted to pH 5.5 with NaOH(1M) The GAC/Fe slurry was rinsed and filtered with DI water through a number 35 sieve (500 µm, 0.019"). The GAC was then air dried and stored at room temperature until used. Under the conditions of these procedures, iron was present predominantly as Fe(III) oxides rather than Fe(II), although the mineral form of iron was not identified. Representative samples of the GAC/Fe stock were analyzed by inductively coupled argon plasma (ICAP) (USEPA, 1996). Metals were extracted from the GAC by digesting 0.25 g in 40 mL of 10% nitric acid for 40 minutes in a microwave oven at 150° C. and 1000 kPa (USEPA, 1995.)

RESULTS

Batch Regeneration Studies

The iron and manganese concentrations in the GAC, and batch regeneration performance data are summarized in Table 1. Baseline levels of Fe(24.0 mg/kg) and Mn(<0.55 mg/kg) in the unamended GAC were very low, allowing us to prepare carbons with anomalously high Fe/Mn ratios (>103) by precipitating Fe on the surface. Since total Fe and Mn were determined following digestion of the GAC, the fraction of total metals that were available to react with $H_2O_2$ is not known. Although limited Mn concentrations were measured for the GAC reported here, ICAP analyses of other commercially available GACs (data not shown) used in similar studies in our laboratory indicated that total Mn concentrations are generally much higher and provide a plausible, non-productive sink for $H_2O_2$ and a source of treatment inefficiency.

The treatment ratio (TR) is defined as the molar ration of $Cl^-$ liberated to $H_2O_2$ consumed over the same time frame (i.e. $\Delta Cl^-/\Delta H_2O_2$). Treatment efficiency is TR×100. It was assumed that 2 CP oxidation results in $Cl^-$ cleavage and release.

Addition of Fe to EXP4 carbon was performed for the purpose of enhancing oxidation and improving treatment efficiency. Three enhanced Fe concentrations were evaluated (low, medium, high) (Table 1). Half lives were determined for $H_2O_2$ via regression analysis. In each case, the coefficient of determination ($r^2$) for the line of best fit was >0.97. $H_2O_2$ consumption kinetics were approximately first order in $H_2O_2$ concentration. Incremental iron loading on the GAC led to faster $H_2O_2$ consumption, greater $Cl^-$ release and more efficient use of $H_2O_2$. Treatment ratio calculations based on these experiments underscore the contribution of iron amendment to achievement of treatment objectives.

The low initial slurry pH (pH 4.6) in Fe amended reactors was due to acidity associated with $FeSO_4.7H_2O$ used to alter the Fe content of the GAC. The pH decline measured in these reactors was attributed to different mechanisms, including acid production associated with the Fenton mechanism; hydrogen ion release from 2 CP oxidation; and the production of acidic compounds, such as carboxylic acids. Due to the increasing acidity, the solubility of iron increased. Upon complete reaction of $H_2O_2$ total iron was measured in the solution in each test reactor. The total iron measured in solution accounted for <1%, 3%, and 3.5% of the total mass of iron initially present on the GAC at 5500, 9790, and 12050 mg/kg Fe, respectively. On this basis, the reaction of soluble iron may have contributed to $H_2O_2$ depletion, radical generation, and 2 CP oxidation.

$H_2O_2$ and 2 CP Concentration Effects

The effect of initial $H_2O_2$ concentration (0.28, 0.63, 2.1M) on the oxidation of 2 CP was investigated in slurries of low iron (5.5 g/kg), EXP4 GAC. Time-dependent $H_2O_2$ concentrations indicated that $H_2O_2$ consumption kinetics were approximately first order in $H_2O_2$ concentration (FIG. 1). Half-lives increased with increases in $H_2O_2$ concentration and with each $H_2O_2$ renewal (Table 2). Such changes were due in part to pH effects.

At higher $H_2O_2$ concentrations, .OH productions should increase as per the source term in the *OH reactions equation. An increase in .OH production should correspond to an increase in the rate of 2 CP oxidation. However, an increase in scavenger concentration, such as $H_2O_2$, and the reaction byproduct $Cl^-$, will result in an increase in the rate of radical scavenging leading to a reduction in treatment efficiency. In three consecutive regeneration periods, the TR increased from an average value of $4.7 \times 10^{-4}$ (mole/mole) to $7 \times 10^{-4}$ in reactors containing 0.28 and 0.63M $H_2O_2$, respectively (Table 2). The increase in TR was partially attributed to the decline in pH. The average value of TR decreased between reactors containing 0.63M and 2.1M $H_2O_2$ (Table 2). The decline in TR at higher $H_2O_2$ concentration was attributed to an increase in scavenging from $H_2O_2$. Additionally, reaction rate kinetics may have been limited due to low 2 CP concentration on the GAC during the last application of $H_2O_2$. Overall, the extent of 2 Cp oxidation, as indicated by total $Cl^-$ release with increased $[H_2O_2]$, but it was less efficient at the higher $H_2O_2$ concentration (2.1M).

Under experimental conditions where the initial $H_2O_2$ concentration, total Fe, and pH were similar between reactors, but 2 CP loading on the GAC was varied, a positive correlation was established between the treatment ratio and 2 CP loading (Table 2). An additional increase in the initial 2 CP (131 g/kg) and total iron (9790 mg/kg) concentrations on the GAC also increased the treatment ratio. The source of this increase cannot be specifically determined since the final pH was lower (pH 3.1). Nevertheless, an increase in either the Fe or 2 CP concentration on the surface of the GAC would result in a greater probability of reaction due to the relative proximity of radical generation and target compound.

Sequential Adsorption/Oxidation

To investigate the effect of Fenton reactions on 2 CP sorption to GAC, sequential adsorption/oxidation cycles were performed by adsorbing 2 CP to the GAC (EXP4, 5.5 g/kg Fe) in three successive events using similar procedures, and oxidizing the GAC suspension between sorption events. The first oxidation step involved sequential (replicate) application of $H_2O_2$ solutions (100 mL, 0.59M) to the GAC containing 119 g/kg 2 CP. 62% of the $Cl^-$ from the sorbed 2 CP was recovered. 2 CP was re-adsorbed (90 g/kg 2 CP), and the second oxidation step (100 mL, 2.9M $H_2O_2$) resulted in 125% recovery of the $Cl^-$ in this case was attributed to residual $Cl^-$ retained on the carbon after the first oxidation step. The overall $Cl^-$ recovery from all oxidation events was 89%. Finally, 2 CP was re-adsorbed to the GAC (97 g/kg). Results indicate that the aggressive oxidation procedure used here did not alter the affinity of the GAC surface for 2 CP to a degree that significantly interfered with subsequent 2 CP adsorption reactions.

Product Analysis

The products of oxidative carbon regeneration, identified via GC/MS, included a variety of organic acids. Oxalic and maleic acids were the most abundant, while minor acids were identified as malonic and fumaric. Based on the mass spectrum, tentatively identified compounds include another abundant compound, 2-chloromaleic acid, and minor compounds included hydroxychlorobenzoic acid, two isomers of dihydroxychlorobenzene and a dimer of chlorophenol. Measurements of these chlorinated byproducts indicate that under oxidative conditions, transformation of 2 CP involved ring cleavage without the release of chloride ion. Results are consistent with Getoff and Solar (1986) who reported 2 CP oxidation via *OH yields byproducts including $Cl^-$, hydroxy benzenes (phenol, catechol, resorcinol, hydroquinone, hydroxyhydroquinone), dimers, and chlorinated isomers. Controls were used to differentiate compounds extracted from GAC not attributed to 2 CP nor its oxidation products. None of the transformation byproducts identified above were extracted from the GAC or iron-amended GAC (35.4 g/kg 2 CP) before the regeneration step or from the iron-amended GAC following reaction with $H_2O_2$.

DISCUSSION

The extent and efficiency of 2 CP oxidation increased with either 2 CP or iron oxide on the carbon surface. These observations are consistent with a conceptual model in which contaminant adsorption sites and radical-generation sites are in proximate locations on the GAC surface. An increase in the contaminant or iron concentration on the GAC surface should increase the kinetics of reactions involving *OH and target sorbates. Desorption and oxidation of the contaminant in the aqueous phase will also occur. However, due to the extreme reactivity of the radical, radicals produced heterogeneously will react at or near the surface of the carbon. An increase in the $H_2O_2$ concentration resulted in an increase in the extent of 2 CP oxidation but not in the treatment efficiency. The sources of oxidation inefficiency include non-productive reactions and *OH scavenging. The former can be minimized by selecting a carbon with low $H_2O_2$ reactivity. This can be accomplished using carbon with a low manganese content. Oxidation efficiency can also be improved by judicious selection of pH (Watts, et al., 1991). However, since $H_2O_2$ itself reacts with *OH, a tradeoff between radical generation and scavenging rates is unavoidable. $H_2O_2$ concentrations and the concentrations of naturally occurring radical scavengers in water used to prepare the $H_2O_2$ solution can be selected to minimize scavenging. Overall, these process parameters, and others should be carefully selected to satisfy process objectives at minimum or acceptable cost.

Experimental results involving repeated adsorption/oxidation cycles suggest that on-site regeneration of GAC is possible. Long term, multi-regeneration adsorption/oxidation cycles (i.e., >2) may possibly indicate surface weathering of the carbon or an accumulation of poorly oxidizable compounds which may result in a lower affinity for the target sorbate(s). Although the data provided indicate that treatment efficiency was low in these reactor configurations, process parameters were not fully optimized. The overall feasibility of the proposed carbon regeneration process must be based on site-specific adsorption-oxidation studies, in conjunction with a site-specific, detailed cost analysis. Costs associated with excavation of spent GAC, transport to a disposal or regeneration facility, disposal, regeneration, transport of regenerated carbon back to the treatment facility, re-emplacement of the GAC, make-up GAC, $H_2O_2$, iron, etc., must all be considered.

The breadth of ground water contaminants amenable to separation on carbon and oxidation via the Fenton-driven mechanism is large. That is, many environmental contaminants are sufficiently hydrophobic for removal on activated carbon and react at moderately high rates with .OH. Therefore, a wide range of contaminant classes, including mixtures of contaminants (i.e., semi-volatiles, BTEX, pesticides, halogenated volatiles, etc.), are amenable to treatment via the adsorption/oxidation process. The proposed process could be implemented in above-ground reactors or within a reactive barrier wall. A permeable reactive barrier such as that described by Obrien et al. (1997), could be modified to include GAC/Fe media, intermittent $H_2O_2$ perfusion, and $O_2(g)$ venting to facilitate in-situ treatment. There would be several advantages over a barrier containing zero-valent iron, which is unsuitable for destruction of contaminants not amendable to reductive transformations. Thus, the proposed process could provide a long-term barrier and treatment system for mixtures of groundwater contaminants that partition onto activated carbon and react rapidly with *OH.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

REFERENCES

Aggarwal et al, *J. Hazardous Materials* 3(27):301-314 (1991)
Boltz et al, *Interscience Publications* pp. 543 (1978)
Buxton et al, *J. Phys. Chem. Reference Data* 2(17):513-886 (1988)
Dorfman and Adams, *National Bureau of Standards*, Report No. NSRDS-NBS-46 (1973)
Gates and Siegrist, *J. Environmental Engineering* pp. 639-644 (September 1995)
Gethoff and Solar, *Radiat. Phys. Chem., Int. J. Radiat. Appl. Instrum. Part C* 5-6(28):443-450 (1986)
Haag and Yao, *Environ. Sci. Technol.* 5(26):1005-1013 (1992)
Hayden, Calgon Carbon Corporation (1998)
Heberer and Stan, *Anal. Chim. Acta* 341:21-34 (1997)
Huling et al, *Environ. Sci. Technol.* 21(32):3436-3441 (1998a)
Huling et al, *J. Environ. Eng.* Accepted (October, 1998b)
Huling et al, *J. Environ. Eng.* 126(7), 595-600 (March, 2000)
Ingles (1972)
Lipczynska-Kochany et al, *Chemosphere* 30(1):9-20 (1995)
Mawhinney, *J. Chromatogr.* 257:37-44 (1983)
Mawhinney et al, *J. Chromatogr.* 361:117-130 (1986)
Nicholls and Schonbaum, "Catalases" in *Enzymes,* Boyer et al, Eds., John Wiley: New York, Vol. 8, pp. 147-225 (1963)
O'Brien et al, "Implementation of a Funnel and Gate System", presented at International Containment Technology Conference and Exhibition, St. Petersburg, Fla., Feb. 9-12, 1997
Pardieck et al, *J. Contaminant Hydrology* 9(3):221-242 (1992)
Pignatello, *Environ. Sci. Technol.* 26(5):944-951 (1992)
Ravikumar and Gurol, *Environ. Sci. Technol.* 3(28):394-400 (1994)
Schumb et al, *Hydrogen Peroxide,* American Chemical Society Monograph Series, Reinhold Publishing Corporation New York, N.Y., p. 759 (1955)
Shetiya et al, *Indian J. Chem.* 14A:575-578 (1976)
USEPA, 1991 Subsurface Contamination Reference Guide
USEPA, 1995 Standard Operating Procedure No. 180. "Total Nitric Acid Extractable Metals from Solids and Sludges by Microwave Digestion"
USEPA, 1996 Standard Operating Procedure No. 181. "ICP Operation by TJA Mark II System"
Walling, *Accounts of Chemical Research* 8:125-131 (1975)
Watts et al, *Hazardous Waste and Hazardous Materials* 4(7):335-345 (1990)
Watts et al, "Treatment of Contaminated Soils Using Catalyzed Hydrogen Peroxide" in *Chemical Oxidations: Technology for the Nineties,* W. W. Eckenfelder et al (Eds) (1991)
Watts et al, *Water Environ. Research* 7(65):839-844 (1993)
Yeh and Novak, *Water Environ. Research* 67(5):828-834 (1995)

What is claimed is:

1. A process for treating contaminants in a gas to destroy said contaminants comprising:
   (a) concentrating the contaminants by passing a gas containing contaminants through a single sorbent amended with or containing iron to which the contaminants adsorb and are concentrated;
   (b) adding a liquid phase oxidant which produces hydroxyl radicals at the sorbent whereby the contaminants are oxidized using a Fenton-driven mechanism and are destroyed in situ; and (c) wherein the iron is reduced by a reductant selected from the group consisting of sodium dithionate and hydroxylamine.

2. A method for removing contaminants from a gas comprising:
  (a) introducing a gas containing contaminants into a first adsorbent reactor in a series of at least two adsorbent reactors, wherein each adsorbent reactor contains a sorbent amended with iron to which the contaminants adsorb and are concentrated;
  (b) adding an oxidant to the first adsorbent reactor, which oxidant produces hydroxyl radicals at the sorbent whereby the contaminants are oxidized using a Fenton-driven mechanism and the contaminants are destroyed in situ; and
  (c) wherein the iron is duced by a reductant selected from the group consist of sodium dithiorate and hydroxylamine.

3. The process according to claim 1 wherein the contaminant is a gas.

4. The process according to claim 1 wherein the sorbent is regenerated in situ.

5. The process according to claim 1 wherein the sorbent is amended with iron selected from the group consisting of ferrous iron and ferric iron.

6. The process according to claim 1 wherein the sorbent is selected from the group consisting of granular activated carbon, powdered activated carbon, anion exchange resins, cation exchange resins, zeolite, alumina, silica, silicates and aluminum phosphates.

7. The process according to claim 6 wherein the sorbent is granulated activated carbon or powdered activated carbon.

8. The process according to claim 1 wherein the oxidizing agent is selected from the group consisting of hydrogen peroxide, ozone, permanganate salts, and persulfate salts.

9. The process according to claim 2 wherein once the sorbent in the first adsorbent reactor is exhausted, the first adsorbent reactor is removed from the series and the sorbent is regenerated using the Fenton reaction.

10. The process according to claim 2 wherein the gas containing contaminants is passed through the adsorbent reactor by up flow of the gas containing contaminants through the sorbent in the adsorbent reactor.

11. The process according to claim 10 wherein after oxidation of the contaminants a basic solution is passed through the sorbent.

12. The process according to claim 11 wherein the basic solution is selected from the group consisting of aqueous solutions of NaOH, KOH, $NaHCO_3$, $Na_2CO_3$, and mixtures thereof.

* * * * *